United States Patent
Toyoda et al.

(10) Patent No.: US 10,584,405 B2
(45) Date of Patent: *Mar. 10, 2020

(54) ELECTRIC RESISTANCE WELDED STEEL PIPE AND MANUFACTURING METHOD THEREFOR

(71) Applicant: JFE STEEL CORPORATION, Tokyo (JP)

(72) Inventors: Shunsuke Toyoda, Kawasaki (JP); Takatoshi Okabe, Handa (JP); Sota Goto, Kawasaki (JP); Yutaka Matsui, Kawasaki (JP); Satoru Yabumoto, Kawasaki (JP)

(73) Assignee: JFE Steel Corporation, Tokyo (JP)

( * ) Notice: Subject to any disclaimer, the term of this patent is extended or adjusted under 35 U.S.C. 154(b) by 302 days.

This patent is subject to a terminal disclaimer.

(21) Appl. No.: 15/531,336

(22) PCT Filed: Nov. 17, 2015

(86) PCT No.: PCT/JP2015/005716
§ 371 (c)(1),
(2) Date: May 26, 2017

(87) PCT Pub. No.: WO2016/084335
PCT Pub. Date: Jun. 2, 2016

(65) Prior Publication Data
US 2017/0356071 A1    Dec. 14, 2017

(30) Foreign Application Priority Data

Nov. 27, 2014    (JP) ................... 2014-239971

(51) Int. Cl.
*C22C 38/16*    (2006.01)
*B21C 37/08*    (2006.01)
(Continued)

(52) U.S. Cl.
CPC .............. *C22C 38/16* (2013.01); *B21B 23/00* (2013.01); *B21C 37/08* (2013.01); *B21C 51/00* (2013.01);
(Continued)

(58) Field of Classification Search
CPC ................. C22C 38/16; C21D 9/08
(Continued)

(56) References Cited

U.S. PATENT DOCUMENTS 7,779,694 B2    8/2010    Iizuka
8,393,217 B2    3/2013    Iizuka et al.
(Continued)

FOREIGN PATENT DOCUMENTS

CN    101300484 A    11/2008
CN    102400054 A    4/2012
(Continued)

OTHER PUBLICATIONS

Japanese Office Action for Japanese Application No. 2016-512155, dated Sep. 8, 2017, including Concise Statement of Relevance of Office Action, 4 pages.
(Continued)

*Primary Examiner* — Weiping Zhu
(74) *Attorney, Agent, or Firm* — RatnerPrestia

(57) ABSTRACT

A resistance welded steel pipe is provided. A hot-rolled steel sheet having a composition containing, in mass %, C: 0.025 to 0.168%, Si: 0.10 to 0.30%, Mn: 0.60 to 1.90%, and one or at least two selected from Ca, Nb, V, and Ti such that Pcm is 0.20 or less is subjected to continuous cold roll forming to obtain a pipe-shaped body. Tapered grooves are formed in the steel sheet such that the ratio of the tapered portions to the wall thickness of the steel sheet is 10 to 80%. Then end surfaces of the pipe-shaped body are butted against each other and subjected to electric resistance welding. Ultrasonic (Continued)

waves are transmitted toward the electric resistance weld surface such that a beam width is within the range of 0.1 to 4.0 mm, and the reflected waves are used for ultrasonic flaw detection using an ultrasonic flaw detector.

8 Claims, 2 Drawing Sheets

(51) Int. Cl.
| | |
|---|---|
| C22C 38/14 | (2006.01) |
| C21D 9/08 | (2006.01) |
| C22C 38/58 | (2006.01) |
| C22C 38/00 | (2006.01) |
| C21D 9/50 | (2006.01) |
| B21C 51/00 | (2006.01) |
| B21B 23/00 | (2006.01) |
| B23K 11/087 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| F16L 9/17 | (2006.01) |
| B23K 101/06 | (2006.01) |
| B23K 103/04 | (2006.01) |
| C21D 8/02 | (2006.01) |

(52) U.S. Cl.
CPC ............ B23K 11/0873 (2013.01); C21D 9/08 (2013.01); C21D 9/50 (2013.01); C22C 38/00 (2013.01); C22C 38/001 (2013.01); C22C 38/002 (2013.01); C22C 38/02 (2013.01); C22C 38/04 (2013.01); C22C 38/06 (2013.01); C22C 38/08 (2013.01); C22C 38/12 (2013.01); C22C 38/14 (2013.01); C22C 38/58 (2013.01); F16L 9/17 (2013.01); B23K 2101/06 (2018.08); B23K 2103/04 (2018.08); C21D 8/02 (2013.01)

(58) Field of Classification Search
USPC ........................................................ 148/332
See application file for complete search history.

(56) References Cited

U.S. PATENT DOCUMENTS

| | | | | |
|---|---|---|---|---|
| 9,841,124 B2 * | 12/2017 | Toyoda | .................. | B21C 37/08 |
| 2009/0151457 A1 | 6/2009 | Iizuka | | |
| 2010/0032048 A1 | 2/2010 | Yokoyama et al. | | |
| 2015/0083266 A1 * | 3/2015 | Toyoda | .................. | B21C 37/08 |
| | | | | 138/171 |
| 2015/0203933 A1 | 7/2015 | Toyoda et al. | | |
| 2015/0251268 A1 | 9/2015 | Toyoda et al. | | |

FOREIGN PATENT DOCUMENTS

| | | | |
|---|---|---|---|
| EP | 1953544 A1 | 8/2008 | |
| EP | 2116625 A1 | 11/2009 | |
| EP | 2124045 A1 | 11/2009 | |
| EP | 2295615 A1 | 3/2011 | |
| JP | 0724940 B2 | 3/1995 | |
| JP | 0825035 A | 1/1996 | |
| JP | 2004084068 A | 3/2004 | |
| JP | 2007000874 A | 1/2007 | |
| JP | 2008223134 A | 9/2008 | |
| JP | 2008240145 A | 10/2008 | |
| JP | 4377869 B2 | 12/2009 | |
| JP | 4544240 B2 | 9/2010 | |
| JP | 4910770 B2 | 4/2012 | |
| JP | 5076984 B2 | 11/2012 | |
| JP | 5332287 B2 | 11/2013 | |
| JP | 2014009366 A | 1/2014 | |
| JP | 2014062309 A | 4/2014 | |
| WO | WO-2013153819 A1 * | 10/2013 | ............. B21C 37/08 |
| WO | 2013153819 A1 | 12/2015 | |

OTHER PUBLICATIONS

Canadian Office Action for Canadian Application No. 2,966,570, dated May 28, 2018, 4 pages.
Extended European Search Report for European Application No. 15862558.2, dated Nov. 14, 2017, 16 pages.
Chinese Office Action for Chinese Application No. 201580064130. 4, dated Dec. 26, 2018, with Concise Statement of Relevance of Office Action, 6 pages.
Korean Office Action for Korean Application No. 10-2017-7014071, dated Jul. 13, 2018 with Concise Statement of Relevance of Office Action, 6 pages.
Japanese Office Action for Japanese Application No. 2016-512155, dated Feb. 24, 2017, including Concise Statement of Relevance of Office Action, 4 pages.
International Search Report and Written Opinion for International Application No. PCT/JP2015/005716, dated Feb. 16, 2016—6 Pages.
Okabe et al., "Electro Magnetic and Heat Conductive FE Analysis on High Frequency Tube Welding Process", Tetsu-to-Hagane, vol. 93 (2007), No. 5, pp. 373-378.
Chinese Office Action for Chinese Application No. 201580064130. 4, dated Jun. 18, 2019, with Concise Statement of Relevance of Office Action, 5 pages.
Chinese Office Action for Chinese Application No. 201580064130. 4, dated Mar. 21, 2018, including Concise Statement of Search Report, 8 pages.
Non Final Office Action for U.S. Appl. No. 14/394,163, dated Jun. 27, 2017, 8 pages.

* cited by examiner

ELECTRIC RESISTANCE WELDED STEEL PIPE AND MANUFACTURING METHOD THEREFOR

CROSS REFERENCE TO RELATED APPLICATIONS

This is the U.S. National Phase application of PCT/JP2015/005716, filed Nov. 17, 2015, which claims priority to Japanese Patent Application No. 2014-239971, filed Nov. 27, 2014, the disclosures of these applications being incorporated herein by reference in their entireties for all purposes.

TECHNICAL FIELD OF THE INVENTION

The present invention relates to an electric resistance welded steel pipe and to a method for manufacturing the same and, more particularly, to an improvement in toughness and reliability of an electric resistance weld zone.

BACKGROUND OF THE INVENTION

An electric resistance welded steel pipe is produced by subjecting a steel strip to continuous cold forming into a substantially circular cross-section (a pipe-shaped body) using a plurality of rolls, butting the opposed end faces of the pipe-shaped body against each other, and subjecting the butted parts (butted portions) to welding (electric resistance welding) by applying a high-frequency current to the butted portions under application of pressure to thereby obtain a pipe body having a seam (the electric resistance welded steel pipe). During the electric resistance welding, the butted portions are heated to their melting point or higher by resistance heating under application of pressure, so that the steel strip itself serves as a joint metal that joins the butted end faces together. Therefore, the electric resistance welding is essentially classified as fusion welding.

The performance of resistance welded steel pipes has been improved dramatically by a high-frequency welding technique that has advanced significantly since the 1970s, a heat input controlling-monitoring technique that has been developed and used since the 1980s, an online heat treatment technique for seams, and other techniques. Therefore, the electric resistance welded steel pipes are being widely used for applications such as oil country tubular goods and line pipes having an outer diameter of 26 inches or less and a wall thickness of 1 inch or less and used for mining and transportation of petroleum, gas, etc.

However, from the viewpoint of the reliability of the electric resistance weld zones of electric resistance welded steel pipes, the electric resistance welded steel pipes are used only for applications with no severe specification requirements for the electric resistance weld zones. Therefore, various proposals have recently been made in order to improve the reliability of the electric resistance weld zones.

For example, Patent Literature 1 describes an electric resistance welded steel pipe with high cracking resistance and excellent sour resistance in an environment containing wet hydrogen sulfide. In the technique described in Patent Literature 1, the electric resistance welded steel pipe is made of Al-deoxidized steel containing 0.0012% by mass or more of Ca. In this steel pipe, the ratio of Ca/Al in the steel is 0.10% or less, and oxide-based inclusions are contained in an area extending 100 μm in opposite directions from the electric resistance-butt weld surface. In a cross section perpendicular to the butt weld surface and also perpendicular to the axial direction of the pipe, these oxide-based inclusions include inclusions having a shape that is elongated in the direction of the sheet thickness such that the ratio of the length in the thickness direction to the length in the circumferential direction of the pipe is 2 or more and the major axis is 10 μm or more. In the area extending 100 μm in opposite directions from the butt weld surface, the density of the elongated inclusions in the cross section is 5 per $mm^2$ or less. It is stated that this can prevent the occurrence of hydrogen-induced blistering even in a severe environment.

Patent Literature 2 describes a gas shielded welding method for an electric resistance welded steel pipe. In the technique described in Patent Literature 2, the inner side of the pipe is washed with mist to remove suspended scale after fin pass forming but before welding. When local sealing is performed on the weld zone, a sealing device on the inner side of the pipe, except for its holding rollers, is not in contact with the pipe. It is stated that this can prevent the scale from remaining in the weld zone, so that the toughness of the weld zone is significantly improved.

Patent Literature 3 describes a high-strength electric resistance welded line pipe. The electric resistance welded line pipe described in Patent Literature 3 has a composition containing, in mass %, C: more than 0.04 to 0.08%, Si: 0.1 to 0.3%, Mn: more than 1.6 to 2.0%, P: 0.02% or less, S: 0.003% or less, Nb: 0.04 to 0.08%, V: 0.05 to 0.1%, Ni: 0.1 to 0.5%, Cu: 0.1 to 0.5%, Mo: 0.05 to 0.20%, Ti: 0.01 to 0.03%, Al: 0.05% or less, and N: 0.005% or less such that Ni, Cu, and Mo satisfy a specific relation. The metallographic structure of the electric resistance welded line pipe is an acicular ferrite structure with an average crystal grain size of 5 μm or less. The tensile strength of the line pipe in its circumferential direction after flattening is 700 $N/mm^2$ or more, and the 0.5% proof stress of the line pipe is 550 $N/mm^2$ or more. The area occupied by oxides in the electric resistance-butt weld zone is 0.1% (corresponding to 1,000 ppm) or less. The electric resistance welded line pipe described in Patent Literature 3 is an electric resistance welded steel pipe having an outer diameter of 200 to 610 mm and a wall thickness/outer diameter ratio (t/D) of 2% or less and manufactured using a hot rolled steel coil through steps including cold roll forming, electric resistance welding, seam heat treatment, and sizing. It is stated that the electric resistance weld zone has soundness comparable to that of the base material, so that the line pipe can be further reduced in thickness.

Patent Literature 4 describes an electric resistance welded boiler steel pipe. The electric resistance welded boiler steel pipe described in. Patent Literature 4 contains, in mass %, C: 0.01 to 0.20%, Si: 0.01 to 1.0%, Mn: 0.10 to 2.0%, and Cr: 0.5 to 3.5%. P is limited to 0.030% or less, S is limited to 0.010% or less, and 0 is limited to 0.020% or less. (Si %)/(Mn %+Cr %) is from 0.005 to 1.5 inclusive. The area fraction of a ternary mixed oxide of $SiO_2$, MnO, and $Cr_2O_3$ generated during electric resistance welding is 0.1% (corresponding to 1,000 ppm) or less. The number of defects in the electric resistance weld zone is small, and the electric resistance welded boiler steel pipe is excellent in creep rupture strength and toughness.

To obtain an electric resistance welded steel pipe with the electric resistance weld zone having stable performance, it is necessary to appropriately maintain the conditions of electric resistance welding to thereby obtain stable weld quality (seam quality). Therefore, it is important to stabilize the shape of the edges of a steel strip used as a steel pipe raw material, to adjust the positions of the edges during forming and welding, and to stabilize the amount of heat input during electric resistance welding.

When electric resistance welding is performed under the conditions in which optimal welding heat input is obtained, the butted portions of a pipe-shaped body (the edges of a steel strip) are melted sufficiently to form droplets and thereby pressure-welded together. When the amount of heat input is small, the butted portions are pressure-welded together while droplets are not formed sufficiently. Therefore, in a weld zone welded under the conditions in which the amount of heat input is small, a large amount of oxide is observed in the weld surface when the weld zone is ruptured along the weld surface, as shown in FIG. 1(a) in Non Patent Literature 1. A weld zone in which a large amount of oxide is observed in its fractured surfaces is generally called a cold weld or a cold joint. The weld zone shown in Non Patent Literature 1 is a high-frequency weld zone. This means that, even with high-frequency welding with small variations in the amount of heat input, cold welds (weld defects) can be formed depending on the conditions of welding.

CITATION LIST

Patent Literature

PTL 1: Japanese Examined Patent Application Publication No. 7-24940
PTL 2: Japanese Examined Patent Application Publication No. 8-25035
PTL 3: Japanese Unexamined Patent Application Publication No. 2008-223134
PTL 4: Japanese Patent No. 4377869

Non Patent Literature

NPL 1: T. Fukami et al.: "Development of the new welding control method for HF-ERW pipes," Proc. of IPC, (2012) No. 2012-90219, p. 1-8.

SUMMARY OF THE INVENTION

In gas pipelines in Japan, the maximum pressure for electric resistance welded steel pipes has been limited to be lower than that for UOE steel pipes and seamless steel pipes. This may be because the reliability of the electric resistance weld zones has been insufficient. In particular, it has been difficult to sufficiently prevent the occurrence of the cold welds described above and to detect weld defects such as the cold welds. There are some worldwide-known cases in which old line pipes (vintage line-pipes) laid before the 1970s leak several decades after their construction. One of the causes of leakage from old electric resistance welded steel pipes with degraded performance is cold welds.

From this point of view, the technique described in Patent Literature 1 has a problem in that the occurrence of cold welds caused by a local reduction in heat input cannot be avoided. The technique described in Patent Literature 1 is not easily applied to high-strength steel. In addition, the low-temperature toughness of the electric resistance welded steel pipe is insufficient, and it is problematic to use this steel pipe in cold climate areas. Also the techniques described in Patent Literatures 2, 3, and 4 have a problem in that the occurrence of cold welds caused by a local reduction in the amount of heat input cannot be avoided.

It is an object of aspects of the present invention to solve the problems in the conventional techniques and to provide a high-strength electric resistance welded steel pipe in which the occurrence of weld defects such as cold welds is avoided and which has excellent resistance to leakage under internal pressure and excellent electric resistance weld zone toughness. It is another object to provide a method for manufacturing the high-strength electric resistance welded steel pipe.

The term "high-strength" as used herein means a base material portion of the electric resistance welded steel pipe is equivalent to API grade X 56, i.e., has a yield strength YS of 400 MPa or more.

The phrase "excellent resistance to leakage under internal pressure" as used herein means that no leakage occurs when an internal pressure test is performed under the conditions in which an internal pressure of 95% of the yield strength at room temperature ($\sigma y_{RT}$) is applied at a test temperature of 0° C. The internal pressure test is performed in the manner described in Non Patent Literature (S. Toyoda, S. Goto, T. Okabe, H. Kimura, S. Igi, Y. Matsui, S. Yabumoto, A. Sato, M. Suzuki, and T. Inoue: Proc. of IPC (2012), IPC2012-90448). Specifically, a pipe body is placed in a coolant kept at prescribed temperature (0° C. in this case), and then the test is performed under the condition of no notch. More specifically, a steel pipe having a length 8 times longer than its outer diameter is placed in a coolant (ethanol) cooled to prescribed temperature. Then gas (air) is blown from opposite sealed end portions of the steel pipe to increase the pressure inside the steel pipe to a prescribed pressure, and whether or not leakage or rupture occurs is determined.

The phrase "excellent electric resistance weld zone toughness" as used herein means that the absorbed energy $vE_{-60}$ in a Charpy impact test performed on the electric resistance weld zone at a test temperature of −60° C. according to the specifications of JIS Z 2242 is 110 J or more and the value of CTOD in a CTOD test performed at a temperature of 0° C. according to the specifications of BS 7448-1995 is 0.80 mm or more.

To achieve the above objects, the present inventors have conducted extensive studies on various factors affecting the resistance to leakage under internal pressure and the electric resistance weld zone toughness. As a result of the studies, the inventors have found that it is important to prevent the occurrence of weld defects, particularly cold welds, in the electric resistance weld zone and to enhance the quality control of the electric resistance weld zone to thereby improve the reliability of the electric resistance weld zone.

First, the inventors have focused attention to a corona bond in spot welding of thin sheets, which is a phenomenon similar to the cold weld in electric resistance welding, and have compared the corona bond with the cold weld in electric resistance welding.

The corona bond in spot welding of thin sheets is a compression bonded portion around the nugget (molten pool). The corona bond is formed when the upper and lower sheets are compression-bonded and heated for a short time during spot welding, and it is known that small oxide clusters are distributed in fractured surfaces of the corona bond. During electric resistance welding, the butted end surfaces of a steel strip (steel sheet) are pre-heated through a high frequency current. Therefore, a larger amount of oxide may be formed during electric resistance welding than during spot welding. According to a provisional calculation by the present inventors, oxide having a thickness of few microns is formed on the end surfaces of the steel strip (steel sheet) during electric resistance welding. In electric resistance welding, when the amount of heat input is low at the end portion of the steel strip (steel sheet) that are exposed to the outside air, droplets may not be formed sufficiently during compression welding. In this case, micron-sized oxide particles may remain present in the electric resistance weld zone, causing cold welds.

In "Defects in resistance welding and their characteristics, —definition and judgment method—" (lines 1 to 5 on page 7) published in February Showa 62 by the Resistance Welding Research Committee of the Japan Welding Society, it is stated that the cold welds are "macro-flat: look grey to the naked eye, are flat, and are observed continuously or over a wide area. Microscopically, the cold welds are fine dimpled fracture surfaces containing spherical inclusions. The term "cold weld" is used in high-frequency resistance (electric resistance) welding, and the cold weld is referred to as a flat fracture in upset welding. Causes of formation are insufficient heat input and abutment failure."

In view of the above, the present inventors have thought that the cold welds in electric resistance welding are weld defects that are formed as a result of a reduction in the amount of heat input. Specifically, as a result of the reduction in the amount of heat input, "the temperature of the end portions of the steel strip (steel sheet) decreases, and this causes the flowability of the molten steel to decrease. In this case, oxide formed during heating is not completely discharged and remains in the weld joint portion (seam portion)." To prevent the occurrence of cold welds, it is necessary to suppress the formation and survival of oxide during heating and to improve the sensitivity for detecting the remaining oxide.

First, the results of fundamental experiments conducted by the present inventors will be described.

An electric resistance welded steel pipe manufacturing facility was used to subject a thin steel sheet (thin steel strip) to continuous cold forming using a plurality of rolls to obtain a substantially cylindrical pipe-shaped body. Then opposed end portions of the pipe-shaped body were butted against each other and subjected to electric resistance welding to obtain a pipe body, whereby an electric resistance welded steel pipe (outer diameter: 323.9 mm ϕ×wall thickness: 10 mm) satisfying the specifications of API 5L X65M was obtained. The electric resistance welding was performed at four different levels of welding heat input, i.e., a normal heat input (reference=1.0), 0.90, 0.80, and 0.75. The amount of heat input is defined by (current (A)×voltage (kV))/(pipe-manufacturing rate (m/min)/pipe thickness (mm)). The normal heat input amount used as the reference was determined by a method described in Japanese Patent No. 5332287.

The soundness of the electric resistance weld zone of each of the electric resistance welded pipes obtained, particularly the presence or absence of cold welds, was examined using an ultrasonic flaw detector for pipe bodies (hereinafter may be referred to as a "high-sensitivity array UT") that uses array probes 6 arranged in the circumferential direction of the pipe as schematically shown in FIG. 3. The frequency of the ultrasonic waves used was 18 MHz. The ultrasonic waves were transmitted such that the beam width on the weld surface of a seam (electric resistance weld zone) 2 was 1.5 mm, and the presence or absence of defects was evaluated under the conditions in which the sensitivity for a ϕ1.6 mm drill hole was +20 dB. In the ultrasonic flaw detector shown in FIG. 3, the weld zone can be scanned in its thickness direction by electronically changing the positions of transmission and reception probes, and flaw detection can be performed in the thickness cross section of the weld zone in the longitudinal direction of the pipe.

The soundness of the weld zone of each of the electric resistance welded steel pipes obtained was evaluated using the above-described ultrasonic flaw detector for pipe bodies, and the results, i.e., the echo height mapping of the cross section of the weld zone in the longitudinal direction, are shown in FIG. 1. The normal heat input amount was set to 1.0 and used as a reference condition. In steep pipe No. III produced under the condition of a low heat input of 0.8 of the normal heat input amount, defect echoes were observed in part of the outer side of the pipe. In steel pipe No. IV produced under the condition of a very low heat input of 0.75 of the normal heat input amount, defect echoes were observed continuously in the longitudinal direction on the outer side of the pipe. For each of the weld zones of the steel pipes in which defect echoes were observed, the structure of a C cross section (a cross section perpendicular to the axial direction of the pipe) was observed and shown in FIG. 2. These defect echoes correspond to oxide remaining in non-welded portions, i.e., correspond to so-called "cold welds."

In steep pipe No. II produced under the condition in which the heat input was at the lower limit not significantly different from the reference condition, no defect echoes were observed. This level of reduction in the amount of heat input is within a controllable range in electric resistance welding.

Electric resistance welded steel pipes (outer diameter: 660.4 mm ϕ×wall thickness: 25.4 mm) satisfying the API 5L X80 specifications were produced. Specifically, tapered grooves were used to form their electric resistance weld zones, and electric resistance welding was performed using different welding heat inputs ranging from 1.1 to 0.75 relative to the normal heat input as a reference heat input. Then the "high-sensitivity array UT" was used to examine the soundness of the electric resistance weld zones, particularly the presence or absence of cold welds, in a similar manner as described above. When the welding heat input was within the controllable range of 1.1 to 0.9 with the normal heat input as the reference heat input, no significant increase in echo height was observed. When the welding heat input was reduced and fell outside the controllable range, i.e., 0.8, an increase in echo height was observed. In portions in which an increase in echo height was observed, Fe(Si, Mn)-based oxides formed during electric resistance welding were observed. When the welding heat input was further reduced and was below the controllable range, i.e., 0.75, an increase in echo height was observed continuously. In portions in which an increase in echo height was observed, a coarse oxide layer was found to be formed. It was found that, even in the thick-walled electric resistance welded steel pipes produced by electric resistance welding using tapered grooves, there is a correspondence relation between the amount of welding heat input, the echo height, and the oxides.

As described above, when the amount of heat input during electric resistance welding is low, oxides formed are not discharged and remain in the welded joint portion as weld defects referred to as "cold welds." As a result of the above studies, the present inventors have found that the "cold welds" in a pipe can be detected satisfactorily as defect echoes using the ultrasonic flaw detector for pipe bodies that uses a beam diameter controlled as described above and uses the array probes arranged in the circumferential direction of the pipe.

The present inventors have also recognized that, in order to suppress the formation of oxides in the electric resistance weld zone to thereby ensure excellent electric resistance weld zone toughness and excellent resistance to leakage under internal pressure, it is necessary that the contents of elements such as C, Si, and Mn that can easily cause oxides to remain in the electric resistance weld zone are controlled within appropriate ranges. The inventors have found that it is necessary that the electric resistance welded steel pipe have a composition containing, in mass %, C: 0.025 to 0.168%, Si: 0.10 to 0.30%, Mn: 0.60 to 1.90%, P: 0.001 to 0.018%, S: 0.0001 to 0.0029%, Al: 0.010 to 0.10%, Ca: 0.0001 to 0.0035%, N: 0.0050% or less, 0: 0.0030% or less, and one or at least two selected from Nb: 0.001 to 0.070% or less, V: 0.001 to 0.065% or less, and Ti: 0.001 to 0.033% or less, wherein Pcm is 0.20 or less.

The present inventors have newly found that the occurrence of cold welds can be avoided by suppressing the formation of oxides during heating and the survival of the formed oxides as described above and improving the sensitivity of detection of the remaining oxides in a combined manner. A high-strength electric resistance welded steel pipe having a highly reliable electric resistance weld zone can thereby be provided.

The present inventors have used, as an indicator indicating that the reliability of an electric resistance weld zone is high, "resistance to leakage under internal pressure" that means that no leakage occurs when the internal pressure test is performed at a test temperature of 0° C. under the conditions in which an internal pressure of 95% of the yield strength at room temperature is applied. The internal pressure test is performed in the manner described in Non Patent Literature (S. Toyoda, S. Goto, T. Okabe, H. Kimura, S. Igi, Y. Matsui, S. Yabumoto, A. Sato, M. Suzuki, and T. Inoue: Proc. of IPC (2012), IPC 2012-90448). Specifically, a pipe body is placed in a coolant kept at prescribed temperature (0° C. in this case), and then the test is performed under the condition of no notch.

Aspects of the present invention have been completed by conducting further studies on the basis of the above findings. Aspects of the present invention are summarized as follows.

[1] An electric resistance welded steel pipe having a composition comprising, in mass %, C: 0.025 to 0.168%, Si: 0.10 to 0.30%, Mn: 0.60 to 1.90%, P: 0.001 to 0.018%, S: 0.0001 to 0.0029%, Al: 0.010 to 0.10%, Ca: 0.0001 to 0.0035%, N: 0.0050% or less, O: 0.0030% or less, and one or at least two selected from Nb: 0.001 to 0.070%, V: 0.001 to 0.065%, and Ti: 0.001 to 0.033%, with the balance being Fe and unavoidable impurities, wherein Pcm defined by formula (1) below is 0.20 or less, and having, in each of a base material portion and an electric resistance weld zone, a structure that includes a quasi-polygonal ferrite phase having an average grain size of 10 μm or less and serving as a primary phase at a volume fraction of 90% or more, with the balance being a secondary phase at a volume fraction of 10% or less, wherein the base material portion has a yield strength YS of 400 MPa or more in an axial direction of the electric resistance-welded steel pipe, wherein electric resistance weld zone toughness of the electric resistance welded steel pipe is such that an absorbed energy $vE_{-60}$ in a Charpy impact test performed at a test temperature of −60° C. according to specifications of JIS Z 2242 is 110 J or more and that a CTOD value in a CTOD test performed at a test temperature of 0° C. according to specifications of BS 7448-1995 is 0.80 mm or more, and wherein no leakage occurs in an internal pressure test performed under conditions of a test temperature of 0° C. and an internal pressure of 0.95×(yield strength at room temperature ($\sigma y_{RT}$)):

$$Pcm = C + Si/30 + Mn/20 + Cu/20 + Ni/60 + Cr/20 + Mo/15 + V/10 + 5B \quad (1)$$

where C, Si, Mn, Cu, Ni, Cr, Mo, V, and B represent contents (in mass %) of respective elements, which is made zero for an element not contained.

[2] The electric resistance welded steel pipe according to [1], wherein the composition further comprises, in mass %, one or at least two selected from Cu: 0.001 to 0.350%, Ni: 0.001 to 0.350%, and Mo: 0.001 to 0.350%.

[3] The electric resistance welded steel pipe according to [1] or [2], wherein the composition further comprises, in mass %, one or two selected from Cr: 0.001 to 0.350% and B: 0.0001 to 0.0030%.

[4] A method for manufacturing an electric resistance welded steel pipe, the method comprising; subjecting a steel pipe raw material to continuous cold forming using a forming mill to thereby obtain a pipe-shaped body, the forming mill including a plurality of cage rolls and a plurality of fin pass rolls that are arranged successively; butting end surfaces of the pipe-shaped body against each other using squeeze rolls; subjecting the butted end surfaces to electric resistance welding by high-frequency heating under application of pressure to thereby obtain a pipe body; and subjecting an axial weld surface of an electric resistance weld zone of the pipe body to inspection, wherein the steel pipe raw material has a composition containing, in mass %, C: 0.025 to 0.168%, Si: 0.10 to 0.30%, Mn: 0.60 to 1.90%, P: 0.001 to 0.018%, S: 0.0001 to 0.0029%, Al: 0.010 to 0.10%, Ca: 0.0001 to 0.0035%, N: 0.0050% or less, O: 0.0030% or less, and one or at least two selected from Nb: 0.001 to 0.070%, V: 0.001 to 0.065%, and Ti: 0.001 to 0.033%, with the balance being Fe and unavoidable impurities, wherein Pcm defined by formula (1) below is 0.20 or less, wherein the steel pipe raw material is a hot-rolled steel sheet having a yield strength YS of 360 MPa or more, wherein, when the hot-rolled steel sheet is subjected to forming by the fin pass rolls, lateral end surfaces of the hot-rolled steel sheet are beveled to form tapered grooves, wherein distances from tapering start positions of the tapered grooves to surfaces of the pipe-shaped body are such that the ratio of the sum of the distance between the outer surface of the pipe-shaped body and the tapering start position of one of the tapered grooves and the distance between the inner surface of the pipe-shaped body and the tapering start position of the other one of the tapered grooves to the wall thickness of the steel sheet is 10 to 80%, wherein the inspection is performed using an ultrasonic flaw detector using array probes to check whether a prescribed amount or more of a non-metallic portion is not present in the electric resistance weld zone of the pipe body, the array probes transmitting ultrasonic waves toward the axial weld surface of the electric resistance weld zone of the pipe body such that a beam width is within the range of 0.1 mm to 4.0 mm, the array probes receiving a part or all of the ultrasonic waves reflected from the weld surface, wherein, after the inspection, the electric resistance weld zone of the pipe body obtained by the electric resistance welding is subjected to weld zone reheat treatment including heating the electric resistance weld zone to a heating temperature of 850 to 1,150° C. and cooling the electric resistance weld zone at a cooling rate in the range of 20 to 200° C./s, the cooling rate being an average cooling rate when the temperature of a central portion, with respect to a thickness direction of the pipe body, of the electric resistance weld zone is in the range of 780 to 630° C., wherein electric resistance weld zone toughness of the pipe body is such that an absorbed energy $vE_{-60}$ in a Charpy impact test performed at a test temperature of −60° C. according to specifications of JIS Z 2242 is 110 J or more and that a CTOD value in a CTOD test performed at a test temperature of 0° C. according to specifications of BS 7448-1995 is 0.80 mm or more, and wherein no leakage occurs in an internal pressure test performed under conditions of a test temperature of 0° C. and an internal pressure of 0.95×(yield strength at room temperature $\sigma y_{RT}$)

$$Pcm = C + Si/30 + Mn/20 + Cu/20 + Ni/60 + Cr/20 + Mo/15 + V/10 + 5B \quad (1)$$

where C, Si, Mn, Cu, Ni, Cr, Mo, V, and B represent contents (in mass %) of respective elements.

[5] The method for manufacturing an electric resistance welded steel pipe according to [4], wherein the composition further contains, in mass %, one or at least two selected from Cu: 0.001 to 0.350%, Ni: 0.001 to 0.350%, and
Mo: 0.001 to 0.350%.

[6] The method for manufacturing an electric resistance welded steel pipe according to [4] or [5], wherein the composition further contains, in mass %, one or two selected from Cr: 0.001 to 0.350% and B: 0.0001 to 0.0030%.

The present invention is a high-strength electric resistance welded steel pipe in which the occurrence of weld defects such as cold welds is avoided and which has excellent resistance to leakage under internal pressure and excellent electric resistance weld zone toughness. The present invention is also a method for manufacturing the high-strength electric resistance welded steel pipe.

DETAILED DESCRIPTION OF EMBODIMENTS OF THE INVENTION

Figure 1:
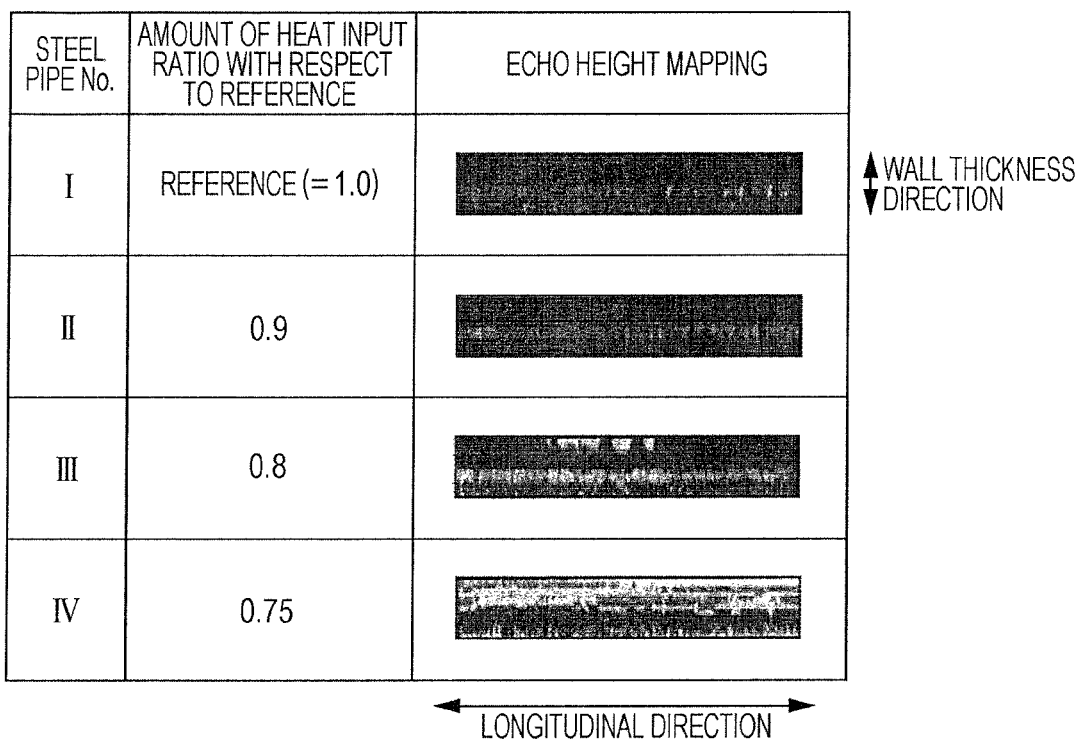
FIG. 1 shows illustrations comparing echo height mappings of longitudinal cross sections of weld zones of electric resistance welded steel pipes.
Figure 2:
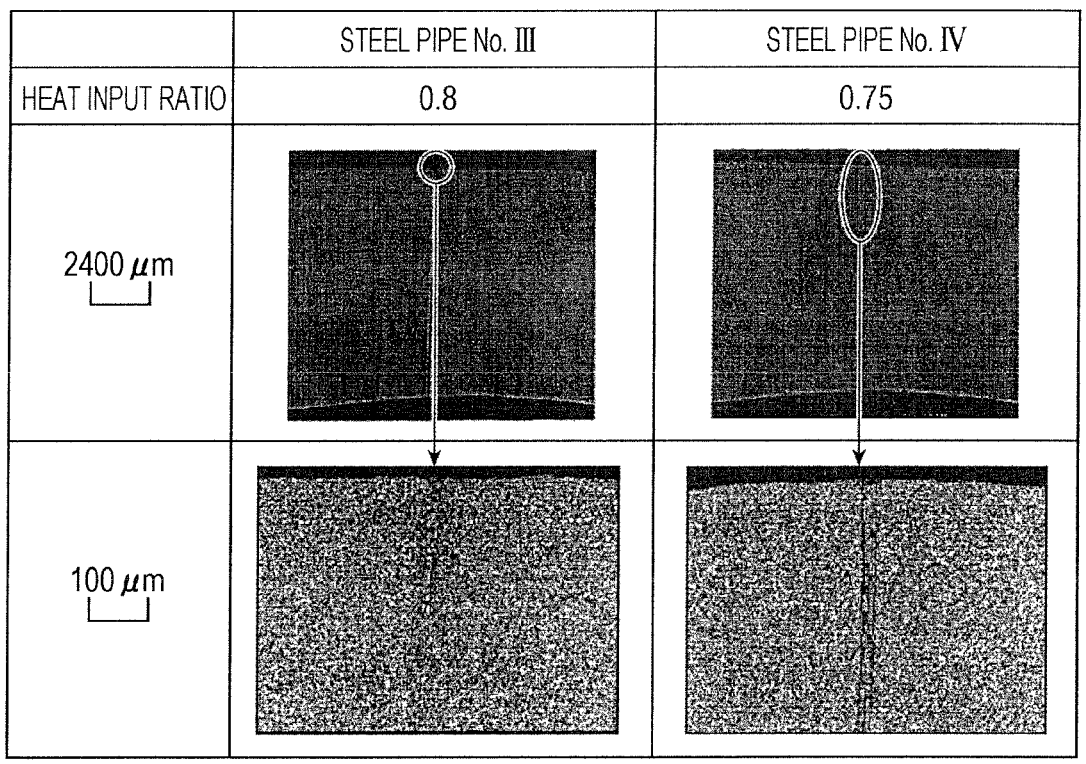
FIG. 2 shows optical microscope photographs of the cross-sectional structures of electric resistance weld zones in which an increase in echo height has been observed.

The electric resistance welded steel pipe according to aspects of the present invention is a high-strength electric resistance welded steel pipe having yield strength YS of 400 MPa or more in the axial direction of the pipe. In the electric resistance welded steel pipe, the occurrence of weld defects such as cold welds is avoided. The electric resistance welded steel pipe has excellent resistance to leakage under internal pressure and excellent electric resistance weld zone toughness and has a highly reliable electric resistance weld zone. The electric resistance welded steel pipe according to aspects of the present invention has excellent electric resistance weld zone toughness. Specifically, the absorbed energy $vE_{-60}$ in the Charpy impact test performed at a test temperature of −60° C. according to the specifications of JIS Z 2242 is 110 J or more, and the value of CTOD in the CTOD test preformed at a test temperature of 0° C. according to the specifications of BS 7448-1995 is 0.80 mm or more. Needless to say, the base material portion has the toughness described above. The electric resistance welded steel pipe according to aspects of the present invention has excellent resistance to leakage under internal pressure. Specifically, no leakage occurs in the internal pressure test preformed under the conditions of a test temperature of 0° C. and an internal pressure of 0.95×(yield strength at room temperature $\sigma y_{RT}$).

Next, a method for manufacturing the electric resistance welded steel pipe according to aspects of the present invention will be described.

The electric resistance welded steel pipe according to aspects of the present invention is manufactured by: subjecting a steel pipe raw material to continuous cold forming using a forming mill to thereby prepare a pipe-shaped body, the forming mill including a plurality of cage rolls and a plurality of fin pass rolls that are arranged successively; butting end surfaces of the pipe-shaped body against each other using squeeze rolls; subjecting the butted end surfaces to electric resistance welding by high-frequency heating for melting under application of pressure to thereby obtain a pipe body; and subjecting an axial weld surface of an electric resistance weld zone of the pipe body to inspection. The axial weld surface is a surface parallel to the axial direction of the pipe and located at a central portion with respect to the circumferential direction of the pipe.

The steel pipe raw material used is a hot-rolled steel sheet having yield strength YS of 360 MPa or more. The term "steel sheet" is intended to encompass a steel strip.

First, a description will be given of the reasons for the limitations on the composition of the hot-rolled steel sheet used as the steel pipe raw material in accordance with aspects the present invention. In the following description, "mass %" in the composition is simply denoted by %.

C: 0.025 to 0.168%

C is an element having the function of contributing to an increase in the strength of the steel sheet (steel pipe) through solid solution strengthening, strengthening by formation of a hard phase such as pearlite, pseudo pearlite, or cementite, or strengthening by improvement in hardenability which facilitates the formation of a hard phase such as bainite or martensite. C has an influence on the formation of oxides in the electric resistance weld zone through lowering of a freezing point or a CO forming reaction with $O_2$ in a vapor phase during electric resistance welding, and therefore the content of C is preferably as small as possible. However, to ensure the desired high strength (the yield strength of the steel pipe raw material: 360 MPa or more, the yield strength of the base material portion of the steel pipe in the axial direction: 400 MPa or more), the content of C must be 0.025% or more. The content is preferably 0.030% or more. If the content of C exceeds 0.168%, the volume fraction of the hard phase in the electric resistance weld zone and the base material portion exceeds 10%, and this causes deterioration in toughness. In particular, the deterioration in the toughness of the electric resistance weld zone causes deterioration in the resistance to leakage under internal pressure. In this case, it cannot be ensured that no leakage and rupture occur over the entire length of the weld zone during the internal pressure test in which an internal pressure of 95% of the yield strength YS at room temperature is applied at 0° C. Therefore, the content of C is limited within the range of 0.025 to 0.168%. The content of C is preferably 0.084% or less.

Si: 0.10 to 0.30%

Si contributes to an increase in the strength of the steel sheet (steel pipe) through solid solution strengthening. Si has a higher affinity for O (oxygen) than Fe and forms high-viscosity eutectic oxide together with Mn oxide in the electric resistance weld zone. If the content of Si is less than 0.10%, the concentration of Mn in the eutectic oxide increases. In this case, the melting point of the oxide exceeds the temperature of molten steel, and the oxide is likely to remain present in the electric resistance weld zone. Therefore, the amount of the oxide present in the electric resistance weld zone increases, and this causes deterioration in the toughness of the electric resistance weld zone, so that it cannot be ensured that no leakage and rupture occur over the entire length during the internal pressure test in which an internal pressure of 95% of the yield strength YS at room temperature is applied at 0° C. Thus, the content of Si is 0.10% or more and preferably 0.15% or more. If the content of Si exceeds 0.30%, the concentration of Si in the eutectic oxide increases. In this case, the melting point of the oxide exceeds the temperature of the molten steel, and the absolute amount of the oxide increases. Then the oxide is likely to remain present in the electric resistance weld zone, and this causes deterioration in the toughness of the electric resistance weld zone, so that it cannot be ensured that no leakage and rupture occur over the entire length during the internal pressure test. Therefore, the content of Si is limited within the range of 0.10 to 0.30%. The content of Si is preferably 0.25% or less.

Mn: 0.60 to 1.90%

Mn contributes to an increase in the strength of the steel sheet (steel pipe) through solid solution strengthening and structural transformation strengthening. Mn has a higher affinity for O (oxygen) than Fe and forms high-viscosity eutectic oxide together with Si oxide in the electric resistance weld zone. If the content of Mn is less than 0.60%, the concentration of Si in the eutectic oxide increases. In this case, the melting point of the oxide exceeds the temperature of the molten steel, and the oxide is likely to remain present in the electric resistance weld zone. This causes deterioration in the toughness of the electric resistance weld zone, so that it cannot be ensured that no leakage and rupture occur over the entire length during the internal pressure test performed at 0° C. If the content of Mn is less than 0.60%, the structures of the base material portion and the electric resistance weld zone become coarse quasi-polygonal ferrite or polygonal ferrite having a grain size of more than 10 µm. This causes deterioration in toughness, so that it cannot be ensured that no leakage and rupture occur over the entire length during the internal pressure test performed at 0° C. Therefore, the content of Mn is 0.60% or more and preferably 0.85% or more. If the content of Mn exceeds 1.90%, the concentration of Mn in the eutectic oxide in the electric resistance weld zone increases. In this case, the melting point of the oxide exceeds the temperature of the molten steel, and the absolute amount of the oxide increases. Then the oxide is likely to remain present in the electric resistance weld zone, and this causes deterioration in the toughness of the electric resistance weld zone, so that it cannot be ensured that no leakage and rupture occur over the entire length during the internal pressure test performed at 0° C. If the content of Mn exceeds 1.90%, the fraction of the hard phase in the base material portion and the electric resistance weld zone exceeds 10%, and this causes deterioration in the toughness. Therefore, the content of Mn is limited within the range of 0.60 to 1.90%. The content of Mn is preferably 1.65% or less.

P: 0.001 to 0.018%

P is an element that is present as an impurity in the steel and is likely to segregate at grain boundaries etc. P co-segregates with Mn and adversely affects the toughness etc. The amount of P is preferably as small as possible. However, from the viewpoint of the economic efficiency in the process of steelmaking, the content of P is limited to 0.001% or more. If the content of P exceeds 0.018%, significant deterioration in toughness occurs in the base material portion and the electric resistance weld zone. Therefore, the content of P is limited to 0.001 to 0.018%. The content of P is preferably 0.013% or less.

S: 0.0001 to 0.0029%

S is an element that is present as sulfides such as MnS and CaS in the base material portion and the electric resistance weld zone and adversely affects the toughness etc., so that the content of S is preferably as small as possible. However, from the viewpoint of the economic efficiency in the process of steelmaking, the content of S is limited to 0.0001% or more. If the content of S exceeds 0.0029%, significant deterioration in toughness occurs, so that it cannot be ensured that no leakage and rupture occur over the entire length during the internal pressure test performed at 0° C. Therefore, the content of S is limited within the range of 0.0001 to 0.0029%. The content of S is preferably 0.0001 to 0.0019%.

Al: 0.010 to 0.10%

Al is an element that acts as a deoxidizer in the steelmaking process. Al precipitates as AlN and suppresses grain growth during austenite heating to thereby contribute to an improvement in low-temperature toughness. Al has a higher affinity for O (oxygen) than Si and Mn and forms oxide in the form of a solid solution in Mn—Si eutectic oxide such as $2MnO \cdot SiO_2$ (tephroite).

To obtain this effect, the content of Al must be 0.010% or more. If the content of Al is less than 0.010%, the desired deoxidation ability cannot be ensured in the steelmaking process, and this causes deterioration in cleanliness of the steel. In addition, the amount of oxide present in the electric resistance weld zone increases, and deterioration in toughness occurs, so that it cannot be ensured that no leakage and rupture occur over the entire length during the internal pressure test performed at 0° C. If the content of Al exceeds 0.10%, the concentration of Al in the eutectic oxide increases. In this case, the melting point of the oxide exceeds the temperature of the molten steel, and the oxide is likely to remain present in the electric resistance weld zone. This causes the amount of the oxide present in the electric resistance weld zone to increase, and deterioration in toughness occurs. Therefore, it cannot be ensured that no leakage and rupture occur over the entire length during the internal pressure test performed at 0° C. From the reasons described above, the content of Al is limited within the range of 0.010 to 0.10%. The lower limit of the content is preferably 0.03% or more. The upper limit of the content is preferably 0.08% or less.

Ca: 0.0001 to 0.0035%

Ca is an element that controls the shape of sulfides in the steel such that the sulfides assume a spherical shape. In particular, Ca contributes to an improvement in the toughness around the electric resistance weld zone of the steel pipe. To obtain this effect, the content of Ca must be 0.0001% or more. Ca has a high affinity for O. Therefore, if the content of Ca exceeds 0.0035%, the concentration of Ca in the oxide increases. In this case, the melting point of the oxide exceeds the temperature of the molten steel, and the absolute amount of the oxide increases. Then the oxide is likely to remain present in the electric resistance weld zone, and this causes deterioration in the toughness of the electric resistance weld zone, so that it cannot be ensured that no leakage and rupture occur over the entire length during the internal pressure test performed at 0° C. Therefore, the content of Ca is limited within the range of 0.0001 to 0.0035%. The lower limit of the content is preferably 0.0002% or more. The upper limit of the content is preferably 0.0028% or less.

N: 0.0050% or Less

N is bonded to nitride-forming elements such as Ti and precipitates as nitrides or is present as a solid solute and adversely affects the toughness of the base material and electric resistance weld zone of the steel pipe. Therefore, the content of N is preferably as small as possible. However, from the viewpoint of the economic efficiency in the process of steelmaking, the lower limit of the content of N is preferably 0.0001%. If the content of N exceeds 0.0050%, the amount of nitrides and the amount of solid solution N increase, and this causes deterioration in toughness. Therefore, the content of N is limited to 0.0050% or less. The content of N is preferably 0.0040% or less.

O: 0.0030% or Less

O (oxygen) remains present as oxide-based inclusions and adversely affects various properties such as toughness and ductility. Therefore, it is preferable to reduce the content of O as much as possible. However, from the viewpoint of the economic efficiency in the process of steelmaking, the content of O is preferably 0.0001% or more. If the content of O exceeds 0.0030%, significant deterioration in toughness occurs. Therefore, the content of O is limited to 0.0030% or less. The content of O is preferably 0.0020% or less.

One or at least two selected from Nb: 0.001 to 0.070%, V: 0.001 to 0.065%, and Ti: 0.001 to 0.033%

Nb, V, and Ti are each an element that precipitates mainly as carbide and contributes to an increase in the strength of the steel sheet (steel pipe) through precipitation strengthening, and one or at least two of them are selected and contained.

Nb precipitates mainly as carbide and contributes to an increase in the strength of the steel sheet (steel pipe) through precipitation strengthening. To obtain this effect, the content of Nb must be 0.001% or more. If the content of Nb is less than 0.001%, the desired strength of the steel sheet (steel pipe) cannot be ensured. If the content of Nb exceeds 0.070%, large undissolved Nb carbonitride remains present, and this causes deterioration in toughness. Therefore, when Nb is contained, its content is limited within the range of 0.001 to 0.070%. The lower limit of the content is preferably 0.005% or more. The upper limit of the content is preferably 0.055% or less.

V precipitates mainly as carbide, as does Nb, and contributes to an increase in the strength of the steel sheet (steel pipe) through precipitation strengthening. To obtain this effect, the content of V must be 0.001% or more. If the content of V is less than 0.001%, the desired strength of the steel sheet (steel pipe) cannot be ensured. If the content of V exceeds 0.065%, large undissolved V carbonitride remains present, and this causes deterioration in toughness. Therefore, when V is contained, its content is limited within the range of 0.001 to 0.065%. The lower limit of the content is preferably 0.005% or more. The upper limit of the content is preferably 0.050% or less.

Ti precipitates mainly as carbide, as do Nb and V, and contributes to an increase in the strength of the steel sheet (steel pipe) through precipitation strengthening. To obtain this effect, the content of Ti must be 0.001% or more. If the content of Ti is less than 0.001%, the desired strength of the steel sheet (steel pipe) cannot be ensured. If the content of Ti exceeds 0.033%, large undissolved Ti carbonitride remains present, and this causes deterioration in toughness. Therefore, when Ti is contained, its content is limited within the range of 0.001 to 0.033%. The lower limit of the content is preferably 0.005% or more. The upper limit of the content is preferably 0.020% or less.

The balance is Fe and unavoidable impurities.

The components described above are basic components. In addition to the basic components, one or at least two selected from Cu: 0.001 to 0.350%, Ni: 0.001 to 0.350%, and Mo: 0.001 to 0.350% and/or one or two selected from Cr: 0.001 to 0.350% and B: 0.0001 to 0.0030% may be contained as optional elements as needed.

One or at least two selected from Cu: 0.001 to 0.350%, Ni: 0.001 to 0.350%, and Mo: 0.001 to 0.350%

Cu, Ni, and Mo are each an element that improves the corrosion resistance of the steel pipe, and one or at least two of them may be selected and contained as needed.

Cu is an element having the function of improving the corrosion resistance of the steel pipe and improving hardenability. In particular, Cu is contained in order to prevent the base material portion and electric resistance weld zone of a thick-walled steel pipe from having a structure including coarse quasi-polygonal ferrite or polygonal ferrite. The term "coarse" as used herein means that the size of grains in the structure is more than 10 μm. To obtain this effect, the content of Cu is preferably 0.001% or more. However, if the content of Cu exceeds 0.350%, its effect is saturated and is not expected to be commensurate with the content, and this is economically disadvantageous. Therefore, when Cu is contained, it is preferable to limit its content within the range of 0.001 to 0.350%. The lower limit of the content is more preferably 0.05% or more. The upper limit of the content is more preferably 0.290% or less.

Ni is an element having the function of improving the corrosion resistance of the steel pipe and improving hardenability, as is Cu. In particular, Ni is contained in order to prevent the base material portion and electric resistance weld zone of a thick-walled steel pipe from having a structure including coarse quasi-polygonal ferrite. To obtain this effect, the content of Ni is preferably 0.001% or more. However, if the content of Ni exceeds 0.350%, its effect is saturated and is not expected to be commensurate with the content, and this is economically disadvantageous. Therefore, when Ni is contained, it is preferable to limit its content within the range of 0.001 to 0.350%. The lower limit of the content is more preferably 0.05% or more. The upper limit of the content is more preferably 0.290% or less.

Mo is an element having the function of improving the corrosion resistance of the steel pipe and improving hardenability, as are Ni and Cu. In particular, Mo is contained in order to prevent the base material portion and electric resistance weld zone of a thick-walled steel pipe from having a structure including coarse quasi-polygonal ferrite. To obtain this effect, the content of Mo is preferably 0.001% or more. However, if the content of Mo exceeds 0.350%, its effect is saturated and is not expected to be commensurate with the content, and this is economically disadvantageous. Therefore, when Mo is contained, it is preferable to limit its content within the range of 0.001 to 0.350%. The lower limit of the content is more preferably 0.05% or more. The upper limit of the content is more preferably 0.290% or less.

One or two selected from Cr: 0.001 to 0.350% and B: 0.0001 to 0.0030%

Cr and B are each an element that increases the strength of the steel sheet (steel pipe) through structural transformation strengthening, and one or two of them may be contained as needed.

Cr is an element that increases the strength of the steel sheet (steel pipe) through transformation strengthening, as is Mn. To obtain this effect, the content of Cr must be 0.001% or more. Cr has a higher affinity for O (oxygen) than Fe and forms oxide in the electric resistance weld zone. If the content of Cr exceeds 0.350%, the concentration of Cr in the oxide increases. In this case, the melting point of the oxide exceeds the temperature of the molten steel, and the absolute amount of the oxide increases. Then the oxide is likely to remain present in the electric resistance weld zone, and this causes deterioration in the toughness of the electric resistance weld zone. Therefore, when Cr is contained, it is preferable to limit its content with in the range of 0.001 to 0.350%. The lower limit of the content is more preferably 0.02% or more. The upper limit of the content is more preferably 0.290% or less.

B is an element that increases the strength of the steel sheet (steel pipe) through transformation strengthening. To obtain this effect, the content of B is preferably 0.0001% or more. However, if the content of B exceeds 0.0030%, the hardenability rather deteriorates, and the desired high strength cannot be ensured. Therefore, when B is contained, it is preferable to limit its content with in the range of 0.0001 to 0.0030%. The lower limit of the content is more preferably 0.0003% or more. The upper limit of the content is more preferably 0.0022% or less.

In accordance with aspects of the present invention, the above-described components are contained within the ranges described above, and the contents of these components are adjusted such that the value of Pcm defined by the following formula (1) is 0.20 or less.

$$Pcm=C+Si/30+Mn/20+Cu/20+Ni/60+Cr/20+Mo/15+V/10+5B \quad (1)$$

Here, C, Si, Mn, Cu, Ni, Cr, Mo, V, and B represent the contents (in mass %) of the respective elements. When any of the elements in formula (1) is not contained, the content of the element not contained is set to "0"%, and then the value of Pcm is computed.

The Pcm value is a value related to the structure formation after rapid cooling of the electric resistance weld zone. To allow the electric resistance weld zone to have a structure including quasi-polygonal ferrite at a volume fraction of 90% or more, it is important to control the Pcm value. In accordance with aspects of the present invention, the Pcm value is set to 0.20 or less. When the electric resistance weld zone has a structure including quasi-polygonal ferrite at a volume fraction of 90% or more, the desired toughness of the electric resistance weld zone can be ensured, and it can be ensured that no leakage and rupture occur over the entire length during the internal pressure test performed at 0° C. No particular limitation is imposed on the lower limit of the Pcm value. However, preferably, the Pcm value is 0.07 or more in order to allow the steel pipe raw material to have yield strength YS of 360 MPa or more in a stable manner (the base material portion of the steel pipe to have a yield strength of 400 MPa or more in the axial direction).

The hot-rolled steel sheet used as the steel pipe raw material in accordance with aspects of the present invention has the composition described above, has yield strength YS of 360 MPa or more, and has excellent toughness. Specifically, the absorbed energy $vE_{-60}$ in a Charpy impact test performed at a test temperature of −60° C. according to the specifications of JIS Z 2242 is 110 J or more, and the CTOD value in the CTOD test performed at a test temperature of 0° C. according to the specifications of BS 7448-1995 is 0.80 mm or more.

No particular limitation is imposed on the structure of the hot-rolled steel sheet. However, it is preferable that the hot-rolled steel sheet has a structure that allows the above-described high strength and the above-described high low-temperature toughness to be ensured. The structure that allows such toughness to be ensured is preferably a structure including a fine quasi-polygonal ferrite phase having an average grain size of 10 μm or less and serving as a primary phase, with the balance being a secondary phase at a volume fraction of 10% or less. The "quasi-polygonal ferrite" includes acicular ferrite and bainitic ferrite.

No particular limitation is imposed on the method for manufacturing the high-strength hot-rolled steel sheet having the structure described above. For example, the hot-rolled steel sheet can be manufactured as follows. A steel raw material (cast slab) having the composition described above is heated to 1,100 to 1,280° C. and subjected to hot rolling including rough rolling and finishing rolling with a finishing temperature of 750° C. or higher. Immediately after completion of the hot rolling, cooling is started to cool the hot-rolled steel material to a cooling stop temperature of 600° C. or lower such that the average cooling rate in the temperature range of 780 to 630° C. is 5° C./s or more, and then the resulting steel material is coiled at a coiling temperature of 400 to 580° C.

In accordance with aspects of the present invention, the steel pipe raw material is a hot-rolled steel sheet having a yield strength of 360 MPa or more and the composition described above and preferably having the structure described above. Then the steel pipe raw material is subjected to continuous cold forming using an ordinary forming mill to thereby prepare a pipe-shaped body. The forming mill includes a plurality of cage rolls and a plurality of fin pass rolls that are arranged successively. No particular limitation is imposed on the specific configuration of the forming mill, and any forming method for a pipe-shaped body using an ordinary forming mill can be used. The yield strength of the base material of the steel pipe is larger than the yield strength of the steel pipe raw material because of the strengthening caused by forming into the pipe-shaped body.

Figure 4:
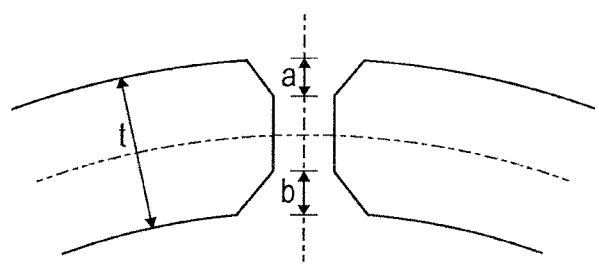
FIG. 4 is a schematic diagram illustrating tapered grooves. The distances from tapering start positions to surfaces of a pipe are denoted by "a" (on the inner side of the pipe) and "b" (on the outer side of the pipe). The distances from the tapering start positions to the pipe surfaces are determined in the thickness direction.

In accordance with aspects of the present invention, when the steel sheet (hot-rolled steel sheet) used as the steel pipe raw material is subjected to forming by fin pass rolls, tapered grooves are formed in lateral end surfaces of the steel sheet. The tapered grooves are formed such that the sum of the distance, in the thickness direction of the steel sheet, between a surface that later becomes the outer surface of the pipe and a tapering start position of one of the tapered grooves and the distance between a surface that later becomes the inner surface of the pipe and a tapering start position of the other one of the tapered grooves is 10 to 80% of the wall thickness of the steel sheet (see FIG. 4).

When the sum of the distance, in the thickness direction of the steel sheet, between the surface that later becomes the outer surface of the pipe and one of the tapering start positions in each lateral end surface of the steel sheet and the distance between the surface that later becomes the inner surface of the pipe and the other one of the tapering start positions is 10 to 80% of the wall thickness of the steel sheet, discharge of oxides is facilitated. Therefore, the amount of oxides present in the electric resistance weld zone is reduced, and the toughness is improved, so that it can be ensured that no leakage and rupture occur over the entire length during the internal pressure test in which an internal pressure of 95% of the YS at room temperature is applied at 0° C. The lower limit of the sum of the distances is preferably 30% or more. The upper limit of the sum of the distances is preferably 70% or less. The tapered shape is not limited to a straight line and may be any curved shape.

The pipe-shaped body with the tapered grooves formed in the lateral end surfaces of the steel sheet is formed into a pipe body using an ordinary method. Specifically, the opposed end portions (lateral end surfaces) of the pipe-shaped body are butted against each other using the squeeze rolls, and the butted portions are heated and melted by high-frequency heating under application of pressure to thereby perform electric resistance welding.

The axial weld surface of the electric resistance weld zone of the obtained pipe body is subjected to inspection to check whether no defects are detected in the pipe body.

Figure 3:
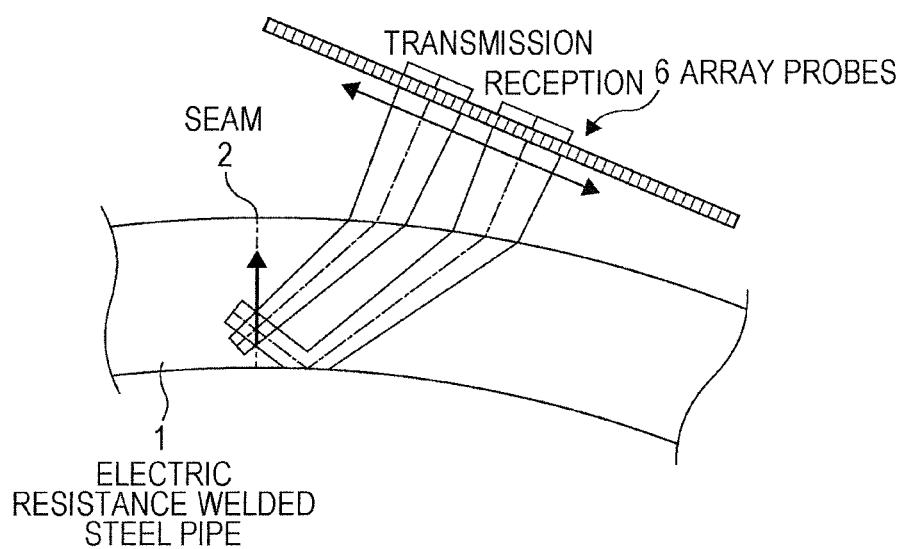
FIG. 3 is an illustration showing the outline of a method for flaw detection in a weld zone using an ultrasonic flaw detector that uses array probes.

The inspection of the electric resistance weld zone is performed using the ultrasonic flaw detector (hereinafter may be referred to as a "high-sensitivity array UT") for pipe bodies that uses array probes arranged in the circumferential direction of the pipe as schematically shown in FIG. 3. The details of the ultrasonic flaw detector for pipe bodies are described in Japanese Patent Nos. 4544240, 4910770, and 5076984.

In accordance with aspects of the present invention, the above-described ultrasonic flaw detector for pipe bodies that uses the array probes is used to transmit ultrasonic waves toward the axial weld surface of the pipe body such that the width of the beam is within the range of 0.1 mm to 4.0 mm, and part or all of the reflected waves from a non-metallic portion such as oxides and voids in the weld surface are received. The presence of defects in the electric resistance weld zone can be judged from the results of the inspection of the axial weld surface.

If the beam width is 0.1 mm or less, it is not possible to perform flaw detection over the entire weld surface that fluctuates in the circumferential direction, so that some portions may not be inspected. If the beam width exceeds 4.0 mm, oxides that cause leakage and deterioration in toughness due to cold welds cannot be detected. If the beam width is not appropriate, the condition of the axial weld surface may not be correctly known even when the amount of oxides is sufficiently small. Therefore, the beam width is limited to 0.1 to 4.0 mm. The lower limit of the beam width is preferably 0.3 mm, and the upper limit of the beam width is preferably 2.0 mm.

When the inspection shows that a prescribed amount or more of the non-metallic portion is not present in the electric resistance weld zone of the pipe body, this pipe body is used as a pipe product. The phrase "a prescribed amount of more" as used herein means that the ratio of the area occupied by the non-metallic portion to the total area of the electric resistance weld zone is more than 0.049. The inspection described above may be performed with seam annealing treatment.

Then the inspected pipe body in which the prescribed amount of more of the non-metallic portion is not present in the electric resistance weld zone is subjected to weld zone reheat treatment (seam annealing treatment). Specifically, the electric resistance weld zone formed by the electric resistance welding is heated to a heating temperature of 850 to 1,150° C. and then cooled at a cooling rate of 20 to 200° C./s. The cooling rate is an average cooling rate when the temperature of a central portion with respect to the thickness direction is in the range of 780 to 630° C. The pipe body obtained is shipped as a pipe product.

If the heating temperature of the weld zone reheat treatment (seam annealing treatment) is lower than 850° C., the heating temperature is too low to ensure the desired electric resistance weld zone toughness. If the heating temperature is high and exceeds 1,150° C., coarsening occurs in the structure, and the desired electric resistance weld zone toughness cannot be ensured. Therefore, the heating temperature of the seam annealing treatment is limited to 850 to 1,150° C.

If the cooling rate of the electric resistance weld zone after the seam annealing treatment is less than 20° C./s, the cooling is too slow to ensure the structure in which the fine quasi-polygonal ferrite phase with a crystal grain size of 10 μm or less serves as the primary phase, so that the desired hardness and toughness of the electric resistance weld zone cannot be ensured. If the cooling is performed at a rapid rate of more than 200° C./s, the electric resistance weld zone cannot have the structure in which the quasi-polygonal ferrite phase serves as the primary phase, and the desired electric resistance weld zone toughness cannot be ensured. Therefore, the average cooling rate when the temperature of the central portion with respect to the thickness direction is in the temperature range of 780 to 630° C. during the cooling performed after the seam annealing treatment is limited to 20 to 200° C./s. If the cooling stop temperature exceeds 500° C., a pearlite structure is formed, and the desired hardness and toughness of the electric resistance weld zone may not be ensured. Therefore, it is preferable that the cooling stop temperature after the seam annealing treatment is 500° C. or lower. To suppress the formation of pearlite over the entire thickness, the cooling stop temperature is more preferably 450° C. or lower. Needless to say, tempering treatment may be performed after the seam annealing treatment in order to stabilize the quality of the material.

The temperature of the central portion with respect to the thickness direction is determined by computing the temperature distribution of a cross section of the weld zone using electromagnetic field analysis and heat transfer analysis (for example, Okabe et al., Tetsu-to-Hagane, Vol. 93 (2007), No. 5, p 373 to 378) and correcting the results using the actual temperatures of the outer and inner surfaces.

The pipe product manufactured by the above-described manufacturing method is an electric resistance welded steel pipe having the above-described composition. Each of the base material portion and the electric resistance weld zone has a structure that includes a quasi-polygonal ferrite phase having an average grain size of 10 μm or less and serving as the primary phase at a volume fraction of 90% or more, with the balance being a secondary phase at a volume fraction of 10% or less. The electric resistance weld zone includes no non-metallic portion. The above electric resistance welded steel pipe has a yield strength YS of 400 MPa or more in the axial direction, has no weld defects such as cold welds, has excellent resistance to leakage under internal pressure and excellent electric resistance weld zone toughness, and is a highly reliable electric resistance welded steel pipe.

The term "quasi-polygonal ferrite" as used herein is intended to encompass acicular ferrite and bainitic ferrite. The average grain size of the "quasi-polygonal ferrite" is determined as follows. In a circumferential cross section, the areas of crystal grains that are surrounded by adjacent crystal grains with grain boundaries with a tilt angle of 15° or more therebetween are measured in the central portion with respect to the thickness direction. Then circle equivalent diameters converted from the obtained areas of the crystal grains are determined, and the average of the circle equivalent diameters is used as the average grain size. A value measured using an EBSD (Electro Backscatter Diffraction) apparatus is used as the tilt angle between adjacent crystal grains.

Aspects of the present invention will be further described by way of Examples. In the following Examples, Tables 2-1 and 2-2 are collectively referred to as Table 2, and Tables 3-1 and 3-2 are collectively referred to as Table 3. In Table 1, steel No. N is skipped. In Tables 2 and 3, steel pipe No. 33 is skipped.

Examples

Molten steel having a composition shown in Table 1 was produced using a converter, and a slab (wall thickness: 250 mm) was produced by a continuous casting method. The slab was used as a steel raw material. The steel raw material was subjected to heat treatment in which the steel raw material was soaked at a heating temperature of 1,200±20° C. for 100±20 minutes. Then the resulting steel raw material was subjected to hot rolling including rough rolling and finishing rolling with a cumulative rolling reduction of 61±10% at a finishing rolling temperature of 810±20° C. to thereby obtain a hot-rolled steel sheet (thickness: 25 mm). After completion of the hot rolling, the hot-rolled steel sheet was cooled to a cooling stop temperature of 550±20° C. on a hot-rolling runout table such that the average cooling rate when the central portion with respect to the thickness direction was in the range of 780° C. to 630° C. was 24±8° C. Then the resulting hot-rolled steel sheet was coiled at a coiling temperature of 530±40° C.

The hot-rolled steel sheet was slit to a prescribed width, and the resulting sheet was subjected to continuous cold forming using a forming mill including a plurality of cage rolls and fin pass rolls arranged successively to thereby obtain a pipe-shaped body. Then ends of the pipe-shaped body (lateral ends of the hot-rolled steel sheet) were butted against each other and heated and melted by high-frequency heating under application of pressure using squeeze rolls to perform electric resistance welding, whereby an electric resistance welded steel pipe with an outer diameter of 22 inches (outer diameter: 558.8 mm ϕ×wall thickness: 25 mm) was produced.

Type B steel was used for different types of electric resistance welded steel pipes (steel pipes Nos. 10 to 21). For each of these types, n: 100 pipes were produced using different heat input amounts (current (A)×voltage (kV))/(pipe-manufacturing rate (m/min)/pipe thickness (mm)) ranging from 1.12 to 0.88 relative to a reference value (1.00) during electric resistance welding. All the 100 pipes were subjected to non-destructive inspection using the "high-sensitivity array UT" and the internal pressure test.

When each steel sheet was subjected to forming, tapered grooves having a shape shown in Table 2 were formed at the lateral ends of the steel sheet using the fin pass rolls. In each of the tapered grooves, the distance, in the thickness direction of the steel sheet, between a tapering start position on a lateral end surface and a surface that later becomes the outer or inner surface of the pipe is 8 to 92% of the wall thickness of the steel sheet. The average inclination angle of the tapered grooves is 30±8° with respect to the non-tapered lateral end surfaces.

After the electric resistance welding, the "ultrasonic flaw detector for pipe bodies" described in Japanese Patent Nos. 4544240, 4910770, and 5076984 was used to transmit ultrasonic waves toward the weld surface of the axial weld zone of the pipe body such that a beam width shown in Table 2 was obtained. Then part or all of the reflected waves from a non-metallic portion such as oxides and voids in the weld surface were received, and echo heights were determined to examine the presence or absence of defects such as cold welds.

After the electric resistance weld zone of the pipe body was subjected to the inspection, the electric resistance weld zone was subjected to on-line seam annealing treatment using an induction heater. In the seam annealing treatment, a heating temperature shown in Table 2 was used. In this treatment, the electric resistance weld zone was cooled to a cooling stop temperature shown in Table 2 such that the electric resistance weld zone was cooled at an average cooling rate shown in Table 2 when the temperature of the central portion with respect to the thickness direction was in the range of 780 to 630° C.

Test pieces were taken from the base material portion and electric resistance weld zone of the obtained pipe body (the electric resistance welded steel pipe), and structure observation, a tensile test, a Charpy impact test, a fracture toughness test, and an internal pressure test were performed. The test methods are as follows.

(1) Structure Observation

Test pieces for the structure observation were taken from the base material portion (a position separated 90° from the electric resistance weld zone in the circumferential direction) of the obtained pipe body (the electric resistance welded steel pipe) and a central position of the electric resistance weld zone. A surface perpendicular to the axial direction of the pipe (a C cross section) was used as an observation surface. Each of the test pieces for the structure observation was polished and etched (etched with nital). The structure around a central position with respect to the thickness direction was observed under an optical microscope (magnification: 400×) and a scanning electron microscope (magnification: 2,000×), and photographs were taken at at least four regions. The obtained photographs of the structure (the photographs of the structure taken under the scanning electron microscope) were used to identify the observed structure (phases), and the fractions in the structure were determined by image analysis. When area fractions were determined, the values of the area fractions were used as the values of volume fractions, under the assumption that the structure is uniform three-dimensionally.

In each Inventive Example, the average crystal grain size of "quasi-polygonal ferrite" serving as the primary phase was measured in the central position with respect to the thickness direction using an EBSD (Electro Backscatter Diffraction) device. Specifically, the areas of crystal grains that were surrounded by adjacent crystal grains with grain boundaries with a tilt angle of 15° or more therebetween were measured. Then circle equivalent diameters were determined from the obtained areas, and the average of the circle equivalent diameters was used as the average grain size of the quasi-polygonal ferrite.

(2) Tensile Test

A JIS No. 12 tensile test piece was taken from the base material portion (a position separated 90° from the electric resistance weld zone in the circumferential direction) of each of the pipe bodies obtained (the electric resistance welded steel pipes) such that a tensile direction was aligned with the axial direction of the pipe. Then the tensile test was performed according to the specifications of JIS Z 2241 to determine the tensile properties (the yield strength YS and the tensile strength TS). A test piece with a TS of 490 MPa or more was judged as good.

(3) Charpy Impact Test

V-notched test pieces were taken from the base material portion (a position separated 90° from the electric resistance weld zone in the circumferential direction) of each of the pipe bodies obtained (the electric resistance welded steel pipes) and a central position of the electric resistance weld zone such that the longitudinal direction of the test pieces was aligned with the circumferential direction of the pipe. The Charpy impact test was performed by using the v-notched test pieces according to the specifications of JIS Z 2242. For each portion, three test pieces were taken and tested at a test temperature of −60° C., and the average of the measurements was used as the absorbed energy $vE_{-60}$ (J) of the steel pipe. For each of the types of electric resistance welded steel pipes using the type B steel, the evaluation was performed with n:100, and the lowest value was shown.

(4) Fracture Toughness Test

CTOD test pieces were taken from the base material portion (a position separated 90° from the electric resistance weld zone in the circumferential direction) of each of the pipe bodies obtained (the electric resistance welded steel pipes) and the central position of the electric resistance weld zone according to the specifications of BS 7448-1995 such that the longitudinal direction of the test pieces was perpendicular to the axial direction of the pipe. Then the value of the CTOD was determined at a test temperature of 0° C. according to the specifications of BS 7448-1995. For each of the base material portion and the electric resistance weld zone, the position of the notch was their central position.

For each of the types of electric resistance welded steel pipe using the type B steel, the evaluation was performed with n:100, and the lowest value was shown.

(5) Internal Pressure Test

Each of the pipe bodies obtained (electric resistance welded steel pipes) was used as a test steel pipe, and the internal pressure test was performed under the conditions of a test temperature of 0° C. and an internal pressure of 0.95× (yield strength at room temperature $\sigma y_{RT}$). The internal pressure test was performed in the manner described in S. Toyoda, S. Goto, T. Okabe, H. Kimura, S. Igi, Y. Matsui, S. Yabumoto, A. Sato, M. Suzuki, and T. Inoue: Proc. Of IPC (2012), IPC2012-90448. Specifically, the pipe body was placed in a coolant kept at prescribed temperature (0° C. in this case). An internal pressure of 0.95×(yield strength at room temperature $\sigma_{RT}$) was applied to the test steel pipe under the condition of no notch, and the occurrence of leakage and the occurrence of fracture were evaluated. "Partial leakage" is the state in which, when ten or more test steel pipes were evaluated, leakage was found in more than 0% and 10% or less of the test pieces. "Leakage" is the state in which leakage was found in 10% or more of the test pieces.

The results obtained are shown in Table 3.

TABLE 1

| Steel No. | Chemical component (% by mass) | | | | | | | | | | | | Pcm* | Remarks |
|---|---|---|---|---|---|---|---|---|---|---|---|---|---|---|
| | C | Si | Mn | P | S | Al | Ca | N | O | Nb, V, Ti | Cu, Ni, Mo | Cr, B | | |
| A | 0.050 | 0.19 | 1.05 | 0.006 | 0.0004 | 0.021 | 0.0021 | 0.0030 | 0.0012 | Ti: 0.015, Nb: 0.047 | Mo: 0.012, Cu: 0.17, Ni: 0.14 | — | 0.13 | Compatible Example |
| B | 0.063 | 0.22 | 1.62 | 0.012 | 0.0025 | 0.024 | 0.0015 | 0.0032 | 0.0007 | Ti: 0.011, Nb: 0.032 | Mo: 0.16 | — | 0.16 | Compatible Example |
| C | 0.053 | 0.20 | 1.64 | 0.005 | 0.0023 | 0.036 | 0.0023 | 0.0025 | 0.0012 | Ti: 0.014, Nb: 0.052 | Mo: 0.26 | — | 0.16 | Compatible Example |
| D | 0.041 | 0.15 | 1.01 | 0.004 | 0.0006 | 0.030 | 0.0019 | 0.0027 | 0.0012 | Ti: 0.012, Nb: 0.052, V: 0.052 | Cu: 0.17, Ni: 0.12 | — | 0.11 | Compatible Example |
| E | 0.066 | 0.16 | 1.75 | 0.011 | 0.0028 | 0.036 | 0.0023 | 0.0038 | 0.0006 | Ti: 0.021, Nb: 0.052, V: 0.035 | Mo: 0.35 | Cr: 0.02, B: 0.0012 | 0.19 | Compatible Example |
| F | 0.024 | 0.24 | 1.44 | 0.014 | 0.0022 | 0.063 | 0.0001 | 0.0014 | 0.0018 | Ti: 0.012, Nb: 0.041 | — | — | 0.10 | Comparative Example |
| G | 0.170 | 0.23 | 1.74 | 0.011 | 0.0008 | 0.026 | 0.0002 | 0.0031 | 0.0012 | Ti: 0.013, Nb: 0.037 | — | — | 0.26 | Comparative Example |
| H | 0.122 | 0.05 | 1.38 | 0.016 | 0.0024 | 0.074 | 0.0003 | 0.0030 | 0.0012 | Ti: 0.012, Nb: 0.038 | — | Cr: 0.22 | 0.20 | Comparative Example |
| I | 0.059 | 0.45 | 1.58 | 0.005 | 0.0021 | 0.038 | 0.0001 | 0.0036 | 0.0028 | Ti: 0.011, Nb: 0.045 | — | Cr: 0.25 | 0.17 | Comparative Example |
| J | 0.098 | 0.24 | 0.52 | 0.017 | 0.0025 | 0.049 | 0.0021 | 0.0018 | 0.0007 | Ti: 0.012, Nb: 0.036 | — | Cr: 0.06 | 0.14 | Comparative Example |
| K | 0.095 | 0.13 | 1.98 | 0.012 | 0.0023 | 0.021 | 0.0019 | 0.0033 | 0.0015 | Ti: 0.011, Nb: 0.041 | — | Cr: 0.07 | 0.20 | Comparative Example |
| L | 0.081 | 0.15 | 1.28 | 0.016 | 0.0026 | 0.005 | 0.0011 | 0.0032 | 0.0011 | Ti: 0.015, Nb: 0.043 | — | Cr: 0.05 | 0.15 | Comparative Example |
| M | 0.108 | 0.18 | 1.44 | 0.012 | 0.0021 | 0.250 | 0.0009 | 0.0039 | 0.0022 | Ti: 0.012, Nb: 0.040 | — | Cr: 0.06 | 0.19 | Comparative Example |
| O | 0.089 | 0.20 | 1.53 | 0.009 | 0.0026 | 0.042 | 0.0046 | 0.0039 | 0.0024 | Ti: 0.011, Nb: 0.044 | — | Cr: 0.07 | 0.18 | Comparative Example |
| P | 0.118 | 0.24 | 1.73 | 0.009 | 0.0024 | 0.042 | 0.0022 | 0.0039 | 0.0024 | Ti: 0.014, Nb: 0.039 | — | — | 0.21 | Comparative Example |
| Q | 0.050 | 0.19 | 1.05 | 0.009 | 0.0020 | 0.021 | 0.0021 | 0.0030 | 0.0012 | Ti: 0.015, Nb: 0.047 | — | — | 0.11 | Compatible Example |

TABLE 1-continued

| Steel No. | Chemical component (% by mass) | | | | | | | | | | | | | Pcm* | Remarks |
|---|---|---|---|---|---|---|---|---|---|---|---|---|---|---|---|
| | C | Si | Mn | P | S | Al | Ca | N | O | Nb, V, Ti | Cu, Ni, Mo | Cr, B | | | |
| R | 0.063 | 0.22 | 1.62 | 0.012 | 0.0021 | 0.024 | 0.0015 | 0.0032 | 0.0007 | Ti: 0.011, Nb: 0.032 | — | Cr: 0.21 | 0.16 | Compatible Example |
| S | 0.026 | 0.28 | 1.85 | 0.018 | 0.0007 | 0.013 | 0.0032 | 0.0047 | 0.0029 | Ti: 0.002, Nb: 0.040 | — | — | 0.13 | Compatible Example |
| T | 0.162 | 0.10 | 0.60 | 0.002 | 0.0002 | 0.055 | 0.0003 | 0.0032 | 0.0013 | Ti: 0.030, Nb: 0.068 | — | — | 0.20 | Compatible Example |
| U | 0.082 | 0.15 | 1.45 | 0.022 | 0.0024 | 0.051 | 0.0029 | 0.0027 | 0.0025 | Ti: 0.021, Nb: 0.002 | — | — | 0.16 | Comparative Example |
| V | 0.075 | 0.23 | 1.62 | 0.016 | 0.0035 | 0.043 | 0.0024 | 0.0044 | 0.0026 | Ti: 0.019, Nb: 0.063 | — | — | 0.16 | Comparative Example |
| W | 0.068 | 0.22 | 1.59 | 0.018 | 0.0020 | 0.039 | 0.0023 | 0.0068 | 0.0024 | Ti: 0.017, Nb: 0.059 | — | — | 0.15 | Comparative Example |
| X | 0.073 | 0.21 | 1.78 | 0.015 | 0.0022 | 0.047 | — | 0.0033 | 0.0020 | Ti: 0.027, Nb: 0.059 | — | — | 0.17 | Comparative Example |
| Y | 0.077 | 0.24 | 1.63 | 0.017 | 0.0023 | 0.041 | 0.0003 | 0.0025 | 0.0041 | Ti: 0.019, Nb: 0.044 | — | — | 0.17 | Comparative Example |
| Z | 0.031 | 0.23 | 1.51 | 0.018 | 0.0026 | 0.044 | 0.0002 | 0.0038 | 0.0023 | — | — | — | 0.11 | Comparative Example |
| AA | 0.070 | 0.25 | 1.62 | 0.015 | 0.0021 | 0.042 | 0.0001 | 0.0049 | 0.0022 | Ti: 0.041 | — | — | 0.16 | Comparative Example |
| AB | 0.063 | 0.18 | 1.76 | 0.011 | 0.0027 | 0.034 | 0.0002 | 0.0038 | 0.0018 | Nb: 0.082 | — | — | 0.16 | Comparative Example |
| AC | 0.068 | 0.22 | 1.43 | 0.011 | 0.0027 | 0.047 | 0.0003 | 0.0046 | 0.0019 | V: 0.078 | — | — | 0.15 | Comparative Example |

*Pcm = C + Si/30 + Mn/20 + Cu/20 + Ni/60 + Cr/20 + Mo/15 + V/10 + 5B ... (1)

TABLE 2

| Steel pipe No. | Steel No. | Groove shape Ratio of distance between tapering start position and surface to wall thickness* (%) | Ultrasonic flaw detection | | Weld zone reheat treatment | | | Remarks |
|---|---|---|---|---|---|---|---|---|
| | | | Beam width (mm) | Echo height (%) | Heating temperature (°C.) | Average cooling rate (°C./s) | Cooling stop temperature (°C.) | |
| 1 | A | 8 (4/4) | 1.00 | 60 | 1030 | 30 | 100 | Comparative Example |
| 2 | | 12 (6/6) | | 30 | 1030 | 30 | 100 | Inventive Example |
| 3 | | 24 (12/12) | | 25 | 1030 | 30 | 100 | Inventive Example |
| 4 | | 36 (18/18) | | 20 | 1030 | 30 | 100 | Inventive Example |
| 5 | | 48 (24/24) | | 15 | 1030 | 30 | 100 | Inventive Example |
| 6 | | 60 (30/30) | | 20 | 1030 | 30 | 100 | Inventive Example |
| 7 | | 72 (36/36) | | 25 | 1030 | 30 | 100 | Inventive Example |
| 8 | | 80 (40/40) | | 30 | 1030 | 30 | 100 | Inventive Example |
| 9 | | 92 (46/46) | | 60 | 1030 | 30 | 100 | Comparative Example |
| 10 | B | 60 (30/30) | 0.04 | 10 | 1000 | 25 | 100 | Comparative Example |
| 11 | | | 0.12 | 20 | 1000 | 25 | 100 | Inventive Example |
| 12 | | | 0.24 | 21 | 1000 | 25 | 100 | Inventive Example |
| 13 | | | 0.36 | 20 | 1000 | 25 | 100 | Inventive Example |
| 14 | | | 0.80 | 20 | 1000 | 25 | 100 | Inventive Example |
| 15 | | | 1.00 | 20 | 1000 | 25 | 100 | Inventive Example |
| 16 | | | 1.40 | 20 | 1000 | 25 | 100 | Inventive Example |
| 17 | | | 1.80 | 20 | 1000 | 25 | 100 | Inventive Example |
| 18 | | | 2.40 | 20 | 1000 | 25 | 100 | Inventive Example |
| 19 | | | 3.80 | 18 | 1000 | 25 | 100 | Inventive Example |
| 20 | | | 4.50 | 15 | 1000 | 25 | 100 | Comparative Example |
| 21 | | | 6.00 | 13 | 1000 | 25 | 100 | Comparative Example |
| 22 | C | 60 (30/30) | 1.00 | 18 | 1020 | 30 | 150 | Inventive Example |
| 23 | D | 60 (30/30) | 1.00 | 20 | 1020 | 30 | 150 | Inventive Example |
| 24 | E | 60 (30/30) | 1.00 | 18 | 1020 | 30 | 150 | Inventive Example |

TABLE 2-continued

| Steel pipe No. | Steel No. | Groove shape Ratio of distance between tapering start position and surface to wall thickness* (%) | Ultrasonic flaw detection Beam width (mm) | Ultrasonic flaw detection Echo height (%) | Weld zone reheat treatment Heating temperature (° C.) | Weld zone reheat treatment Average cooling rate (° C./s) | Weld zone reheat treatment Cooling stop temperature (° C.) | Remarks |
|---|---|---|---|---|---|---|---|---|
| 25 | F | 60 (30/30) | 1.00 | 23 | 1020 | 30 | 150 | Comparative Example |
| 26 | G | 60 (30/30) | 1.00 | 57 | 1020 | 30 | 150 | Comparative Example |
| 27 | H | 60 (30/30) | 1.00 | 46 | 1020 | 30 | 150 | Comparative Example |
| 28 | I | 60 (30/30) | 1.00 | 68 | 1020 | 30 | 150 | Comparative Example |
| 29 | J | 60 (30/30) | 1.00 | 35 | 1020 | 30 | 150 | Comparative Example |
| 30 | K | 60 (30/30) | 1.00 | 42 | 1020 | 30 | 150 | Comparative Example |
| 31 | L | 60 (30/30) | 1.00 | 24 | 1020 | 30 | 150 | Comparative Example |
| 32 | M | 60 (30/30) | 1.00 | 57 | 1020 | 30 | 150 | Comparative Example |
| 34 | O | 60 (30/30) | 1.00 | 47 | 1020 | 30 | 150 | Comparative Example |
| 35 | P | 60 (30/30) | 1.00 | 26 | 1020 | 30 | 150 | Comparative Example |
| 36 | Q | 60 (30/30) | 1.00 | 19 | 1020 | 30 | 150 | Inventive Example |
| 37 | R | 60 (30/30) | 1.00 | 20 | 1020 | 30 | 150 | Inventive Example |
| 38 | A | 92 (46/46) | 0.04 | 20 | 1030 | 30 | 100 | Comparative Example |
| 39 | A | 92 (46/46) | 0.12 | 60 | 1030 | 30 | 100 | Comparative Example |
| 40 | A | 92 (46/46) | 3.80 | 60 | 1030 | 30 | 100 | Comparative Example |
| 41 | A | 92 (46/46) | 4.50 | 15 | 1030 | 30 | 100 | Comparative Example |
| 42 | S | 60 (30/30) | 1.00 | 44 | 1030 | 30 | 100 | Inventive Example |
| 43 | T | 60 (30/30) | 1.00 | 23 | 1030 | 100 | 100 | Inventive Example |
| 44 | U | 60 (30/30) | 1.00 | 20 | 1030 | 30 | 100 | Comparative Example |
| 45 | V | 60 (30/30) | 1.00 | 22 | 1030 | 30 | 100 | Comparative Example |
| 46 | W | 60 (30/30) | 1.00 | 19 | 1030 | 30 | 100 | Comparative Example |
| 47 | X | 60 (30/30) | 1.00 | 20 | 1030 | 30 | 100 | Comparative Example |
| 48 | Y | 60 (30/30) | 1.00 | 51 | 1030 | 30 | 100 | Comparative Example |
| 49 | Z | 60 (30/30) | 1.00 | 24 | 1030 | 30 | 100 | Comparative Example |
| 50 | AA | 60 (30/30) | 1.00 | 18 | 1030 | 30 | 100 | Comparative Example |
| 51 | AB | 60 (30/30) | 1.00 | 23 | 1030 | 30 | 100 | Comparative Example |
| 52 | AC | 60 (30/30) | 1.00 | 22 | 1030 | 30 | 100 | Comparative Example |
| 53 | B | 60 (30/30) | 1.00 | 20 | 1130 | 25 | 100 | Inventive Example |
| 54 | B | 60 (30/30) | 1.00 | 20 | 860 | 25 | 100 | Inventive Example |
| 55 | B | 60 (30/30) | 1.00 | 20 | 830 | 25 | 100 | Comparative Example |
| 56 | B | 60 (30/30) | 1.00 | 20 | 1200 | 25 | 100 | Comparative Example |
| 57 | B | 60 (30/30) | 1.00 | 20 | 1030 | 20 | 100 | Inventive Example |
| 58 | 8 | 60 (30/30) | 1.00 | 20 | 1030 | 180 | 100 | Inventive Example |
| 59 | B | 60 (30/30) | 1.00 | 20 | 1030 | 10 | 100 | Comparative Example |
| 60 | B | 60 (30/30) | 1.00 | 20 | 1030 | 300 | 100 | Comparative Example |

*Total (outer surface/inner surface)

TABLE 3

| Steel pipe No. | Steel No. | Base material portion Type** | Base material portion Volume fraction of primary phase (%) | Base material portion Average grain size of QPF (μm) | Electric resistance weld zone Type** | Electric resistance weld zone Volume fraction of primary phase (%) | Electric resistance weld zone Average grain size of QPF (μm) | Tensile properties Base material Yield strength (MPa) | Tensile properties Base material Tensile strength (MPa) | Toughness vE₋₆₀ (J) Base material | Toughness vE₋₆₀ (J) Electric resistance welded portion | Fracture toughness CTOD at 0° C. (mm) Base material | Fracture toughness CTOD at 0° C. (mm) Electric resistance welded portion | Resistance to leakage under internal pressure Leakage and rupture Base material | Resistance to leakage under internal pressure Electric resistance welded portion | Remarks |
|---|---|---|---|---|---|---|---|---|---|---|---|---|---|---|---|---|
| 1 | A | QPF + θ | QPF: 96 | 4 | QPF + θ | QPF: 94 | 6 | 500 | 543 | 210 | 18 | 1.07 | 0.11 | None | Leakage | Comparative Example |
| 2 | | QPF + θ | QPF: 95 | 4 | QPF + θ | QPF: 93 | 6 | 511 | 562 | 218 | 154 | 1.06 | 0.92 | None | None | Inventive Example |
| 3 | | QPF + θ | QPF: 97 | 4 | QPF + θ | QPF: 93 | 6 | 496 | 539 | 220 | 241 | 1.05 | 1.13 | None | None | Inventive Example |
| 4 | | QPF + θ | QPF: 95 | 4 | QPF + θ | QPF: 94 | 6 | 508 | 564 | 241 | 257 | 1.03 | 1.17 | None | None | Inventive Example |
| 5 | | QPF + θ | QPF: 96 | 4 | QPF + θ | QPF: 93 | 6 | 506 | 556 | 215 | 268 | 1.07 | 1.20 | None | None | Inventive Example |
| 6 | | QPF + θ | QPF: 94 | 4 | QPF + θ | QPF: 94 | 6 | 502 | 534 | 220 | 235 | 1.05 | 1.16 | None | None | Inventive Example |
| 7 | | QPF + θ | QPF: 97 | 4 | QPF + θ | QPF: 95 | 6 | 511 | 555 | 211 | 245 | 1.05 | 1.14 | None | None | Inventive Example |
| 8 | | QPF + θ | QPF: 94 | 4 | QPF + θ | QPF: 93 | 6 | 509 | 566 | 218 | 162 | 1.07 | 0.89 | None | None | Inventive Example |
| 9 | | QPF + θ | QPF: 98 | 4 | QPF + θ | QPF: 94 | 6 | 508 | 550 | 212 | 23 | 1.02 | 0.12 | None | Leakage | Comparative Example |
| 10 | B | QPF + θ | QPF: 95 | 5 | QPF + θ | QPF: 91 | 5 | 515 | 572 | 209* | 224* | 0.97* | 1.05* | None | None | Comparative Example |
| 11 | | QPF + θ | QPF: 94 | 5 | QPF + θ | QPF: 92 | 5 | 509 | 547 | 202* | 216* | 0.97* | 1.05* | None | None | Inventive Example |
| 12 | | QPF + θ | QPF: 95 | 5 | QPF + θ | QPF: 93 | 5 | 512 | 551 | 205* | 220* | 0.98* | 1.04* | None | None | Inventive Example |
| 13 | | QPF + θ | QPF: 93 | 5 | QPF + θ | QPF: 93 | 5 | 510 | 548 | 203* | 218* | 0.96* | 1.06* | None | None | Inventive Example |
| 14 | | QPF + θ | QPF: 94 | 5 | QPF + θ | QPF: 92 | 5 | 514 | 571 | 204* | 220* | 0.95* | 1.05* | None | None | Inventive Example |
| 15 | | QPF + θ | QPF: 96 | 5 | QPF + θ | QPF: 92 | 5 | 519 | 577 | 208* | 222* | 0.99* | 1.06* | None | None | Inventive Example |
| 16 | | QPF + θ | QPF: 93 | 5 | QPF + θ | QPF: 92 | 5 | 507 | 551 | 202* | 220* | 0.97* | 1.04* | None | None | Inventive Example |
| 17 | | QPF + θ | QPF: 92 | 5 | QPF + θ | QPF: 91 | 5 | 508 | 558 | 200* | 224* | 0.98* | 1.05* | None | None | Inventive Example |
| 18 | | QPF + θ | QPF: 93 | 5 | QPF + θ | QPF: 90 | 5 | 504 | 542 | 205* | 216* | 0.97* | 1.06* | None | None | Inventive Example |
| 19 | | QPF + θ | QPF: 93 | 5 | QPF + θ | QPF: 91 | 5 | 510 | 537 | 204* | 218* | 0.95* | 1.04* | None | None | Inventive Example |
| 20 | | QPF + θ | QPF: 94 | 5 | QPF + θ | QPF: 92 | 5 | 511 | 574 | 209* | 220* | 0.96* | 1.05* | None | None | Comparative Example |
| 21 | | QPF + θ | QPF: 95 | 5 | QPF + θ | QPF: 94 | 5 | 517 | 580 | 200* | 224* | 0.97* | 1.04* | None | None | Inventive Example |
| 22 | C | QPF + θ | QPF: 96 | 4 | QPF + θ | QPF: 94 | 6 | 601 | 683 | 217 | 218 | 0.84 | 0.87 | None | None | Comparative Example |
| 23 | D | QPF + θ | QPF: 96 | 5 | QPF + θ | QPF: 93 | 6 | 536 | 602 | 228 | 234 | 0.65 | 0.98 | None | None | Comparative Example |
| 24 | E | QPF + θ | QPF: 94 | 4 | QPF + θ | QPF: 92 | 5 | 742 | 853 | 201 | 204 | 0.80 | 0.81 | None | None | Comparative Example |
| 25 | F | QPF + θ | QPF: 88 | -(PF: 11) | QPF + θ | QPF: 89 | -(PF: 13) | 386 | 439 | 19 | 15 | 0.38 | 0.36 | None | None | Comparative Example |
| 26 | G | QPF + θ | QPF: 72 | 5 | QPF + θ | QPF: 60 | 6 | 618 | 735 | 6 | 8 | 0.08 | 0.02 | Leakage | Leakage | Comparative Example |
| 27 | H | QPF + θ | QPF: 89 | 7 | QPF + θ | QPF: 84 | 8 | 480 | 522 | 68 | 14 | 0.35 | 0.07 | None | Leakage | Comparative Example |
| 28 | I | QPF + θ | QPF: 88 | -(PF: 11) | QPF + θ | QPF: 89 | 7 | 507 | 551 | 55 | 9 | 0.32 | 0.05 | None | Leakage | Comparative Example |
| 29 | J | PF + P | PF: 88 | | PF + P | PF: 88 | -(PF: 12) | 370 | 435 | 70 | 26 | 0.36 | 0.12 | Leakage | Leakage | Comparative Example |
| 30 | K | QPF + B | QPF: 96 | 6 | QPF + B | QPF: 62 | 6 | 588 | 660 | 23 | 9 | 0.22 | 0.10 | None | Leakage | Comparative Example |
| 31 | L | QPF + P | QPF: 89 | 11 | QPF + θ | QPF: 89 | 12 | 460 | 489 | 26 | 24 | 0.22 | 0.11 | None | Leakage | Comparative Example |
| 32 | M | PF + P | PF: 88 | -(PF: 7) | PF + θ | PF: 88 | -(PF: 16) | 520 | 605 | 19 | 8 | 0.19 | 0.08 | Leakage | Leakage | Comparative Example |
| 34 | O | QPF + θ | QPF: 93 | 5 | QPF + θ | QPF: 94 | 6 | 512 | 551 | 27 | 13 | 0.22 | 0.13 | None | Leakage | Comparative Example |
| 35 | P | PF + P | PF: 91 | -(PF: 11) | PF + P | PF: 90 | | 536 | 576 | 30 | 26 | 0.24 | 0.14 | None | Leakage | Comparative Example |
| 36 | Q | QPF + θ | QPF: 96 | 5 | QPF + θ | QPF: 94 | 6 | 485 | 538 | 200 | 223 | 1.01 | 1.13 | None | None | Inventive Example |
| 37 | R | QPF + θ | QPF: 95 | 6 | QPF + θ | QPF: 94 | 6 | 508 | 564 | 201 | 213 | 1.02 | 1.08 | None | None | Inventive Example |
| 38 | A | QPF + θ | QPF: 98 | 4 | QPF + θ | QPF: 94 | 6 | 508 | 550 | 212 | 23 | 1.02 | 0.12 | None | Leakage | Comparative Example |
| 39 | A | QPF + θ | QPF: 98 | 4 | QPF + θ | QPF: 94 | 6 | 508 | 550 | 212 | 23 | 1.02 | 0.12 | None | Leakage | Comparative Example |
| 40 | A | QPF + θ | QPF: 98 | 4 | QPF + θ | QPF: 94 | 6 | 508 | 550 | 212 | 23 | 1.02 | 0.12 | None | Leakage | Comparative Example |
| 41 | A | QPF + θ | QPF: 98 | 4 | QPF + θ | QPF: 94 | 6 | 508 | 550 | 212 | 23 | 1.02 | 0.12 | None | Leakage | Comparative Example |

TABLE 3-continued

| Steel pipe No. | Steel No. | Structure - Base material portion Type** | Base material Volume fraction of primary phase (%) | Base material Average grain size of QPF (μm) | Electric resistance weld zone Type** | Electric resistance weld zone Volume fraction of primary phase (%) | Electric resistance weld zone Average grain size of QPF (μm) | Tensile properties Base material Yield strength (MPa) | Tensile properties Base material Tensile strength (MPa) | Toughness vE₋₆₀ (J) Base material | Toughness vE₋₆₀ (J) Electric resistance welded portion | Fracture toughness CTOD at 0° C. (mm) Base material | Fracture toughness CTOD at 0° C. (mm) Electric resistance welded portion | Resistance to leakage under internal pressure Leakage and rupture Base material | Resistance to leakage under internal pressure Leakage and rupture Electric resistance welded portion | Remarks |
|---|---|---|---|---|---|---|---|---|---|---|---|---|---|---|---|---|
| 42 | S | QPF + θ QPF: 91 | 9 | QPF + θ QPF: 90 | 10 | 448 | 492 | 201 | 209 | 0.92 | 0.98 | None | None | Inventive Example |
| 43 | T | QPF + θ QPF: 91 | 4 | QPF + θ QPF: 90 | 6 | 605 | 710 | 115 | 111 | 0.81 | 0.80 | None | None | Inventive Example |
| 44 | U | QPF + θ QPF: 94 | 4 | QPF + θ QPF: 95 | 6 | 505 | 548 | 104 | 106 | 0.72 | 0.74 | None | Leakage | Comparative Example |
| 45 | V | QPF + θ QPF: 95 | 5 | QPF + θ QPF: 96 | 6 | 495 | 542 | 102 | 102 | 0.70 | 0.70 | None | Leakage | Comparative Example |
| 46 | W | QPF + θ QPF: 95 | 5 | QPF + θ QPF: 96 | 6 | 493 | 545 | 106 | 108 | 0.75 | 0.76 | None | Leakage | Comparative Example |
| 47 | X | QPF + θ QPF: 95 | 5 | QPF + θ QPF: 96 | 6 | 501 | 550 | 119 | 108 | 0.82 | 0.76 | None | Leakage | Comparative Example |
| 48 | Y | QPF + θ QPF: 95 | 5 | QPF + θ QPF: 96 | 6 | 498 | 545 | 107 | 108 | 0.76 | 0.76 | None | Leakage | Comparative Example |
| 49 | Z | QPF + θ QPF: 96 | 5 | QPF + θ QPF: 96 | 6 | 395 | 480 | 212 | 208 | 1.05 | 1.02 | None | None | Comparative Example |
| 50 | AA | QPF + θ QPF: 94 | 4 | QPF + θ QPF: 94 | 5 | 745 | 855 | 95 | 93 | 0.61 | 0.59 | None | Leakage | Comparative Example |
| 51 | AB | QPF + θ QPF: 94 | 4 | QPF + θ QPF: 94 | 5 | 751 | 865 | 98 | 99 | 0.62 | 0.63 | None | Leakage | Comparative Example |
| 52 | AC | QPF + θ QPF: 94 | 4 | QPF + θ QPF: 94 | 5 | 746 | 858 | 96 | 95 | 0.62 | 0.62 | None | Leakage | Comparative Example |
| 53 | B | QPF + θ QPF: 96 | 5 | QPF + θ QPF: 92 | 7 | 519 | 577 | 208 | 150 | 0.99 | 0.85 | None | None | Inventive Example |
| 54 | B | QPF + θ QPF: 96 | 5 | QPF + θ QPF: 92 | 5 | 519 | 577 | 208 | 145 | 0.99 | 0.84 | None | None | Inventive Example |
| 55 | B | QPF + θ QPF: 96 | 5 | QPF + θ QPF: 92 | 7 | 519 | 577 | 208 | 105 | 0.99 | 0.75 | None | Leakage | Comparative Example |
| 56 | B | QPF + θ QPF: 96 | 5 | QPF + θ QPF: 92 | 5 | 519 | 577 | 208 | 94 | 0.99 | 0.60 | None | Leakage | Comparative Example |
| 57 | B | QPF + θ QPF: 96 | 5 | QPF + θ QPF: 92 | 5 | 519 | 577 | 208 | 222 | 0.99 | 1.06 | None | None | Inventive Example |
| 58 | B | QPF + θ QPF: 96 | 5 | QPF + θ QPF: 92 | 5 | 519 | 577 | 208 | 138 | 0.99 | 0.82 | None | None | Inventive Example |
| 59 | B | QPF + θ QPF: 96 | 5 | QPF + θ QPF: 92 | 5 | 519 | 577 | 208 | 93 | 0.99 | 0.59 | None | Leakage | Comparative Example |
| 60 | B | QPF + θ QPF: 96 | 5 | QPF + θ QPF: 92 | 5 | 519 | 577 | 208 | 106 | 0.99 | 0.75 | None | Leakage | Comparative Example |

*Minimum value in statistical evaluation with n: 100
**QPF: quasi-polygonal ferrite, P: perlite, θ: cementite, B: bainite, M: martensite, PF: polygonal ferrite In each of the electric resistance welded steel pipes in the Inventive Examples, each of the base material portion and the electric resistance weld zone has a structure that includes a quasi-polygonal ferrite phase having an average grain size of 10 µm or less and serving as the primary phase. No fracture and also no leakage were found in the internal pressure test performed under the conditions of a test temperature of 0° C. and an internal pressure of 0.95×(yield strength at room temperature $\sigma y_{RT}$). Therefore, the electric resistance welded steel pipe has excellent resistance to leakage under internal pressure and the desired high strength (YS: 400 MPa or more). Not only the base material portion but also the electric resistance weld zone has excellent fracture toughness, i.e., a CTOD value of 0.80 mm or more at 0° C., and has excellent toughness, i.e., an absorbed energy $vE_{-60}$ of 110 J or more as measured by the Charpy impact test at −60° C.

In Comparative Examples (except for steel pipes Nos. 10, 20, and 21 described later) failing outside the inventive ranges, the desired high strength was not obtained, the desired structure was not obtained, a non-metallic portion was present in the electric resistance weld zone, so that the absorbed energy $vE_{-60}$ in the Charpy impact test was low, deterioration in fracture toughness occurred, or leakage was found in the internal pressure test.

In steel pipes Nos. 1 and 9 in which the shape of the tapered grooves was outside the inventive range, the $vE_{-60}$ in the Charpy impact test was less than 110 J, and the CTOD value at 0° C. was less than 0.80 mm, so that the desired toughness was not ensured. Therefore, leakage was found in the internal pressure test. Similar results were obtained for steel pipes Nos. 55 to 56 and 59 to 60 in which the heating temperature and the average cooling rate in the weld zone reheat treatment were outside the inventive ranges.

In steel pipes Nos. 26 to 35, 44 to 48, and 50 to 52 in which any of C, Si, Mn, P, S, Al, Ca, N, O, Ti, Nb, V, and Pcm was outside the inventive component ranges, the $vE_{-60}$ of the electric resistance weld zone was less than 110 J, and the CTOD value at 0° C. was less than 0.80 mm, so that the desired toughness was not ensured. Therefore, leakage was found at least in the electric resistance weld zone in the internal pressure test. In steel pipe No. 49 containing no Ti, Nb, and V, the YS and TS of the base material portion were insufficient. In steel pipe No. 25 in which C was lower than the inventive range, the YS was less than 400 MPa, and the desired strength was not ensured. In addition, both in the base material portion and in the electric resistance weld zone, the $vE_{-60}$ was less than 110 J, and the CTOD value at 0° C. was less than 0.80 mm, so that the desired toughness was not ensured.

When an appropriate beam width is used in the ultrasonic flaw detection, the echo height is about 20%, as in steel pipes Nos. 11 to 19. However, in steel pipes Nos. 10, 20, and 21 in which the beam width was outside the inventive range, the echo height was different from the above value, so that it was not possible to judge whether the amount of oxides was sufficiently low.

The invention claimed is:

1. An electric resistance welded steel pipe having a composition comprising, in mass %,
   C: 0.025 to 0.168%, Si: 0.10 to 0.30%,
   Mn: 0.60 to 1.90%, P: 0.001 to 0.018%,
   S: 0.0001 to 0.0029%, Al: 0.010 to 0.10%,
   Ca: 0.0001 to 0.0035%, N: 0.0050% or less,
   O: 0.0030% or less,
   Nb: 0.001 to 0.070%, and
   Ti: 0.001 to 0.033%,
   with the balance being Fe and unavoidable impurities, wherein Pcm defined by formula (1) below is 0.20 or less, and
   having a structure, in each of a base material portion and an electric resistance weld zone, that includes a quasi-polygonal ferrite phase having an average grain size of 10 µm or less and serving as a primary phase at a volume fraction of 90% or more, with the balance being a secondary phase at a volume fraction of 10% or less,
   wherein the base material portion has a yield strength YS of 400 MPa or more in an axial direction of the electric resistance-welded steel pipe,
   wherein electric resistance weld zone toughness of the electric resistance welded steel pipe is such that an absorbed energy $vE_{-60}$ in a Charpy impact test performed at a test temperature of −60° C. according to specifications of JIS Z 2242 is 110 J or more and that a CTOD value in a CTOD test performed at a test temperature of 0° C. according to specifications of BS 7448-1995 is 0.80 mm or more, and
   wherein no leakage occurs in an internal pressure test performed under conditions of a test temperature of 0° C. and an internal pressure of 0.95×(yield strength at room temperature $\sigma y_{RT}$):

$$Pcm=C+Si/30+Mn/20+Cu/20+Ni/60+Cr/20+Mo/15+V/10+5B, \quad (1)$$

where C, Si, Mn, Cu, Ni, Cr, Mo, V, and B represent contents (in mass %) of respective elements, which is made zero for an element not contained.

2. The electric resistance welded steel pipe according to claim 1, wherein the composition further comprises, in mass %, one or at least two selected from
   Cu: 0.001 to 0.350%, Ni: 0.001 to 0.350%, and
   Mo: 0.001 to 0.350%.

3. The electric resistance welded steel pipe according to claim 2, wherein the composition further comprises, in mass %, one or two selected from
   Cr: 0.001 to 0.350% and B: 0.0001 to 0.0030%.

4. The electric resistance welded steel pipe according to claim 1, wherein the composition further comprises, in mass %, one or two selected from
   Cr: 0.001 to 0.350% and B: 0.0001 to 0.0030%.

5. A method for manufacturing an electric resistance welded steel pipe, the method comprising; subjecting a steel pipe raw material to continuous cold forming using a forming mill to thereby obtain a pipe-shaped body, the forming mill including a plurality of cage rolls and a plurality of fin pass rolls that are arranged successively; butting end surfaces of the pipe-shaped body against each other using squeeze rolls; subjecting the butted end surfaces to electric resistance welding by high-frequency heating under application of pressure to thereby obtain a pipe body; and subjecting an axial weld surface of an electric resistance weld zone of the pipe body to inspection,
   wherein the steel pipe raw material has a composition containing, in mass %,
   C: 0.025 to 0.168%, Si: 0.10 to 0.30%,
   Mn: 0.60 to 1.90%, P: 0.001 to 0.018%,
   S: 0.0001 to 0.0029%, Al: 0.010 to 0.10%,
   Ca: 0.0001 to 0.0035%, N: 0.0050% or less,
   O: 0.0030% or less,
   Nb: 0.001 to 0.070%, and
   Ti: 0.001 to 0.033%,
   with the balance being Fe and unavoidable impurities, wherein Pcm defined by formula (1) below is 0.20 or less, wherein the steel pipe raw material is a hot-rolled steel sheet having a yield strength YS of 360 MPa or more, wherein, when the hot-rolled steel sheet is subjected to forming by the fin pass rolls, lateral end surfaces of the hot-rolled steel sheet are beveled to form tapered grooves, wherein distances from tapering start positions of the tapered grooves to surfaces of the pipe-shaped body are such that the ratio of the sum of the distance between the outer surface of the pipe-shaped body and the tapering start position of one of the tapered grooves and the distance between the inner surface of the pipe-shaped body and the tapering start position of the other one of the tapered grooves to the wall thickness of the steel sheet is 10 to 80%, wherein the inspection is performed using an ultrasonic flaw detector using array probes to check whether a prescribed amount or more of a non-metallic portion is not present in the electric resistance weld zone of the pipe body, the array probes transmitting ultrasonic waves toward the axial weld surface of the electric resistance weld zone of the pipe body such that a beam width is within the range of 0.1 mm to 4.0 mm, the array probes receiving part or all of the ultrasonic waves reflected from the weld surface, wherein, after the inspection, the electric resistance weld zone of the pipe body obtained by the electric resistance welding is subjected to weld zone reheat treatment including heating the electric resistance weld zone to a heating temperature of 850 to 1,150° C. and cooling the electric resistance weld zone to a cooling stop temperature of 150° C. or lower at a cooling rate in the range of 20 to 200° C./s, the cooling rate being an average cooling rate when the temperature of a central portion, with respect to a thickness direction of the pipe body, of the electric resistance weld zone is in the range of 780 to 630° C., wherein electric resistance weld zone toughness of the pipe body is such that an absorbed energy $vE_{-60}$ in a Charpy impact test performed at a test temperature of $-60°$ C. according to specifications of JIS Z 2242 is 110 J or more and that a CTOD value in a CTOD test performed at a test temperature of 0° C. according to specifications of BS 7448-1995 is 0.80 mm or more, and wherein no leakage occurs in an internal pressure test performed under conditions of a test temperature of 0° C. and an internal pressure of 0.95×(yield strength at room temperature $(\sigma y_{RT})$:

$$Pcm = C+Si/30+Mn/20+Cu/20+Ni/60+Cr/20+Mo/15+V/10+5B \quad (1)$$

where C, Si, Mn, Cu, Ni, Cr, Mo, V, and B represent contents (in mass %) of respective elements.

6. The method for manufacturing an electric resistance welded steel pipe according to claim 5, wherein the composition further contains, in mass %, one or at least two selected from Cu: 0.001 to 0.350%, Ni: 0.001 to 0.350%, and Mo: 0.001 to 0.350%.

7. The method for manufacturing an electric resistance welded steel pipe according to claim 6, wherein the composition further contains, in mass %, one or two selected from Cr: 0.001 to 0.350% and B: 0.0001 to 0.0030%.

8. The method for manufacturing an electric resistance welded steel pipe according to claim 5, wherein the composition further contains, in mass %, one or two selected from Cr: 0.001 to 0.350% and B: 0.0001 to 0.0030%.

* * * * *